(12) United States Patent
Nose et al.

(10) Patent No.: US 6,522,860 B2
(45) Date of Patent: Feb. 18, 2003

(54) IMAGE SCANNING APPARATUS

(75) Inventors: Yoshitaka Nose, Kyoto (JP); Ryuichi Onaka, Kanzaki-gun (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/057,439

(22) Filed: Jan. 25, 2002

(65) Prior Publication Data

US 2002/0071702 A1 Jun. 13, 2002

Related U.S. Application Data

(63) Continuation of application No. 09/875,386, filed on Jun. 5, 2001.

(30) Foreign Application Priority Data

| Jun. 6, 2000 | (JP) | 2000-169170 |
| Jul. 13, 2000 | (JP) | 2000-212373 |
| Nov. 24, 2000 | (JP) | 2000-357409 |

(51) Int. Cl.$^7$ ............................................. G03G 15/00
(52) U.S. Cl. .................. 399/374; 271/186; 399/367; 399/373
(58) Field of Search ................ 271/3.05, 225, 271/902; 399/367, 368, 370, 373, 374

(56) References Cited

U.S. PATENT DOCUMENTS

| 5,430,356 A | 7/1995 | Ference et al. ............ 315/291 |
| 6,021,305 A | 2/2000 | Sato et al. ................. 399/374 |
| 6,081,688 A | 6/2000 | Okada et al. .............. 399/374 |
| 6,215,976 B1 | 4/2001 | Shida et al. ............... 399/367 |

*Primary Examiner*—Hoang Ngo
(74) *Attorney, Agent, or Firm*—Hogan & Hartson, LLP

(57) ABSTRACT

An image scanning machine includes a document feeder for feeding sheets into a first paper path from a stack one sheet at a time if a one-side scanning mode is selected. If a both-side scanning mode is selected, a sheet is introduced into a second paper path which is an inverting path that turns a sheet, which is fed from the document feeder, upside down prior to scanning. Rollers located at a downstream end of the inverting path reverse a transportation direction of the sheet and feed the sheet to a scanner through a return path. The transportation direction of the sheet is reversed after the scanner scans one side of the sheet, and the sheet is then fed to the scanner again to scan the other side of the sheet. This transportation direction reversal results in turning the sheet upside down. A guide member is located a bifurcation of the return path and the inverting path for opening one of the return and inverting paths and closing the other of the return and inverting paths. Another guide member is located a bifurcation of the first and second paper paths.

17 Claims, 20 Drawing Sheets

FIG. 15

IMAGE SCANNING APPARATUS

This is a continuation of application Ser. No. 09/875,386 filed Jun. 5, 2001, which application is hereby incorporated by reference in its entirety.

CROSS REFERENCES TO RELATED APPLICATIONS

This application claims priority under 35 USC 119 of Japanese Patent Application Nos. 2000-169170, 2000-357409 and 2000-212373 filed in JPO on Jun. 6, 2000, Nov. 24, 2000 and Jul. 13, 2000 respectively, the entire disclosures of which are incorporated herein by reference.

BACKGROUND OF THE INVENTION

1. Field of the Invention

The present invention relates to an image scanning apparatus that can read both front and back sides of each of sheets successively fed to a scanner part.

2. Description of the Related Art

When a conventional image scanning apparatus scans both sides of an original document, its scanner part first scans a front side. The original document is then transferred in a paper path to a space above a discharged paper receiving tray (first paper path) by discharge rollers, and the discharge rollers that nip an end of the original document are caused to rotate in a reverse direction so that the document is moved backward and introduced into another paper path (second paper path) to turn the document upside down. After that, the document is sent to the scanner part again such that a back side of the document, is scanned. Subsequent to this, the document is discharged into the discharge tray.

After reversing the document feed direction in the conventional image scanning apparatus, the document is transferred into the second paper path, as mentioned above. For this reason, a guide member is generally disposed at a branching point between the first and second paper paths. The guide member is a switching member to determine which paper path should be used.

The original document is discharged on the discharge tray with its front side being up. In other words, the first page is up and the second page down. Therefore, when two original sheets of paper are discharged on the tray, page 1 (front side of the first sheet) faces page 4 (back side of the second sheet).

In order to overcome this problem, the original sheet is reintroduced into the paper path after both the two sides of the original sheet are scanned, so that the original sheet is turned upside down again. In this case, however, no scanning is performed. The original paper is then discharged onto the discharge tray.

As a result, page 1 is down, page 2 is up, page 3 is down (so that it contacts page 2), and page 4 is up (in case of the two-sheet scanning).

In this conventional arrangement, however, the original document has to pass the scanning part three times, i.e., when its front side is scanned, back side is scanned and the document is turned upside down without scanning. Accordingly, the scanning operation takes a relatively long period as a whole.

Further, when the original paper passes over the scan part for the third time, no scanning operation is conducted. During this action, therefore, the scanner part is occupied by the original paper without scanning operation, and it is not possible to feed the next original paper to the scan part. Accordingly, the scanning speed of the machine is lowered as a whole.

Moreover, the guide member located at the branching point between the first and second paper paths is driven by an electrically controlled element such as a solenoid when it is switched to connect the first or second paper path to the paper discharge exit. It is required to synthesize rotating movements of paper feed roller(s) with the switching movement of the guide member. This makes the paper feed control complicated.

SUMMARY OF THE INVENTION

An object of the present invention is to provide an image scanning apparatus that can eliminate the above-described problems.

One concrete object of the present invention is to reduce the time needed to scan both sides of an original document.

Another concrete object of the present invention is to drive a guide member disposed at a paper path branching point without employing a complicated control program.

According to one aspect of the present invention, there is provided an image scanning apparatus comprising: a scanner; a document feeder for receiving sheets in a stack and feeding one sheet at a time; an inverting path for turning a sheet, which is fed from the document feeder, upside down before scanning; a transportation means located at a downstream end of the inverting path for reversing a transportation direction of the sheet and feeding the sheet to the scanner through a return path; a reversing means for reversing the transportation direction of the sheet after the scanner scans one side of the sheet, and feeding the sheet to the scanner again to scan the other side of the sheet; and a discharging means for discharging the sheet after the two sides of the sheet are scanned. The sheet is substantially turned upside down when its transportation direction is reversed and fed to the scanner for the second time.

A guide member may be located a bifurcation of the return path and the inverting path for opening one of the return and inverting paths and closing the other of the return and inverting paths, whereby it is possible to introduce the sheet into the return path after the sheet is fed towards the scanner from the downstream end of the inverting path.

The transportation means may include at least one roller, and the reversing means may include at least one roller. The guide member may pivot as the transportation means rotates. The guide member may be operatively connected to the transportation means via a torque limiter.

Three rollers may be arranged to form two pairs of rollers, and one of the two pairs of rollers may constitute the transportation means whereas the other pair of rollers may constitute the reversing means. The latter pair of rollers may also constitute the discharging means.

Alternatively, two rollers may only be arranged to constitute all of the transportation means, reversing means and discharging means.

Additional objects, aspects, benefits and advantages of the present invention will become apparent to those skilled in the art to which the present invention pertains from the subsequent detailed description and the appended claims, taken in conjunction with the accompanying drawings.

BRIEF DESCRIPTION OF THE SEVERAL VIEWS OF THE DRAWINGS

FIG. 15 illustrates a lateral cross sectional view of ADF according to a second embodiment of the present invention;

DETAILED DESCRIPTION OF THE INVENTION

Embodiments of the present invention will now be described in reference to the accompanying drawings. In the following description, a facsimile machine is employed as an image scanning apparatus of the present invention.

Figure 1:
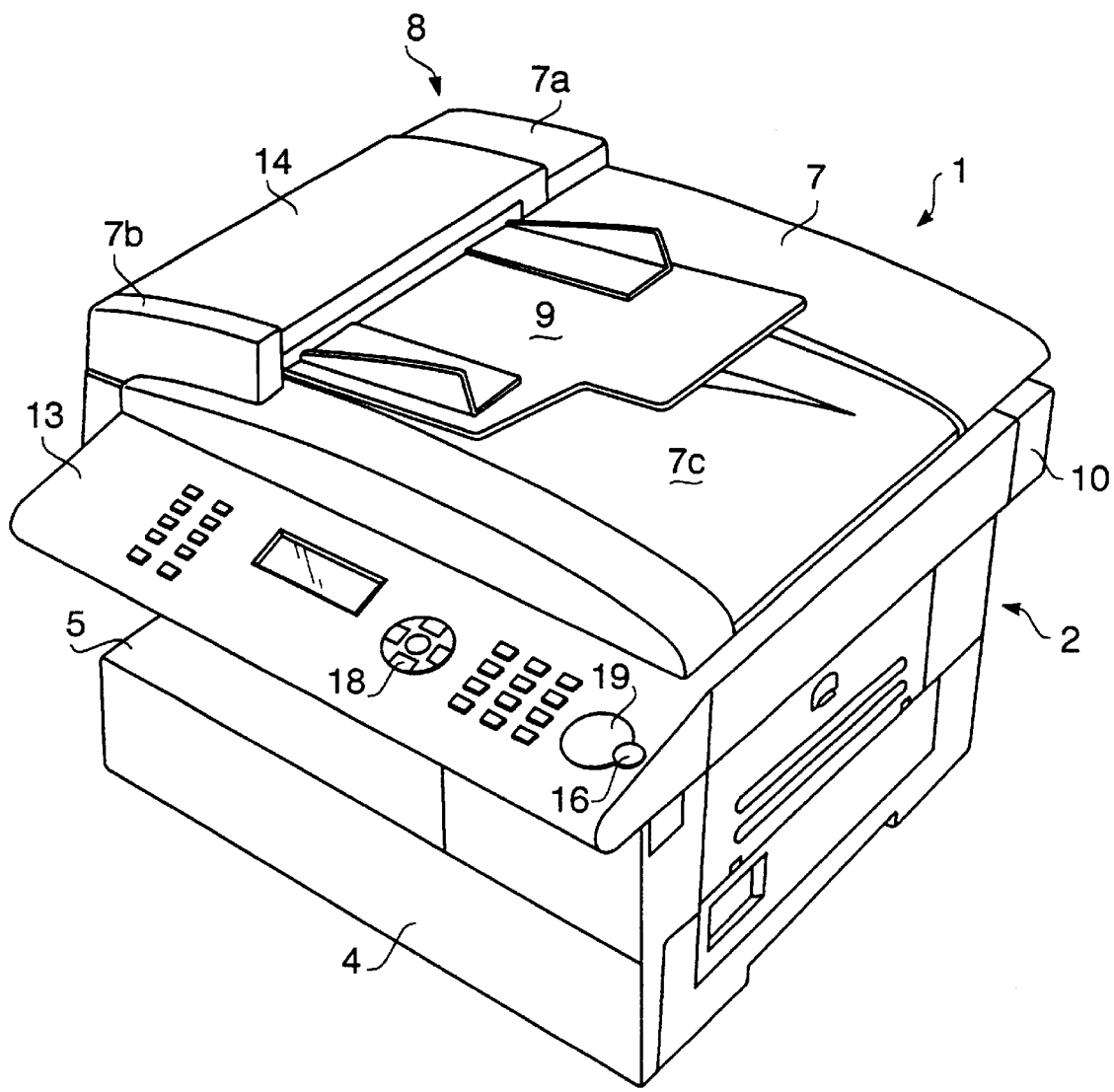
FIG. 1 illustrates a perspective view of a facsimile machine incorporating an image scanning device according to a first embodiment of the present invention.
Figure 2:
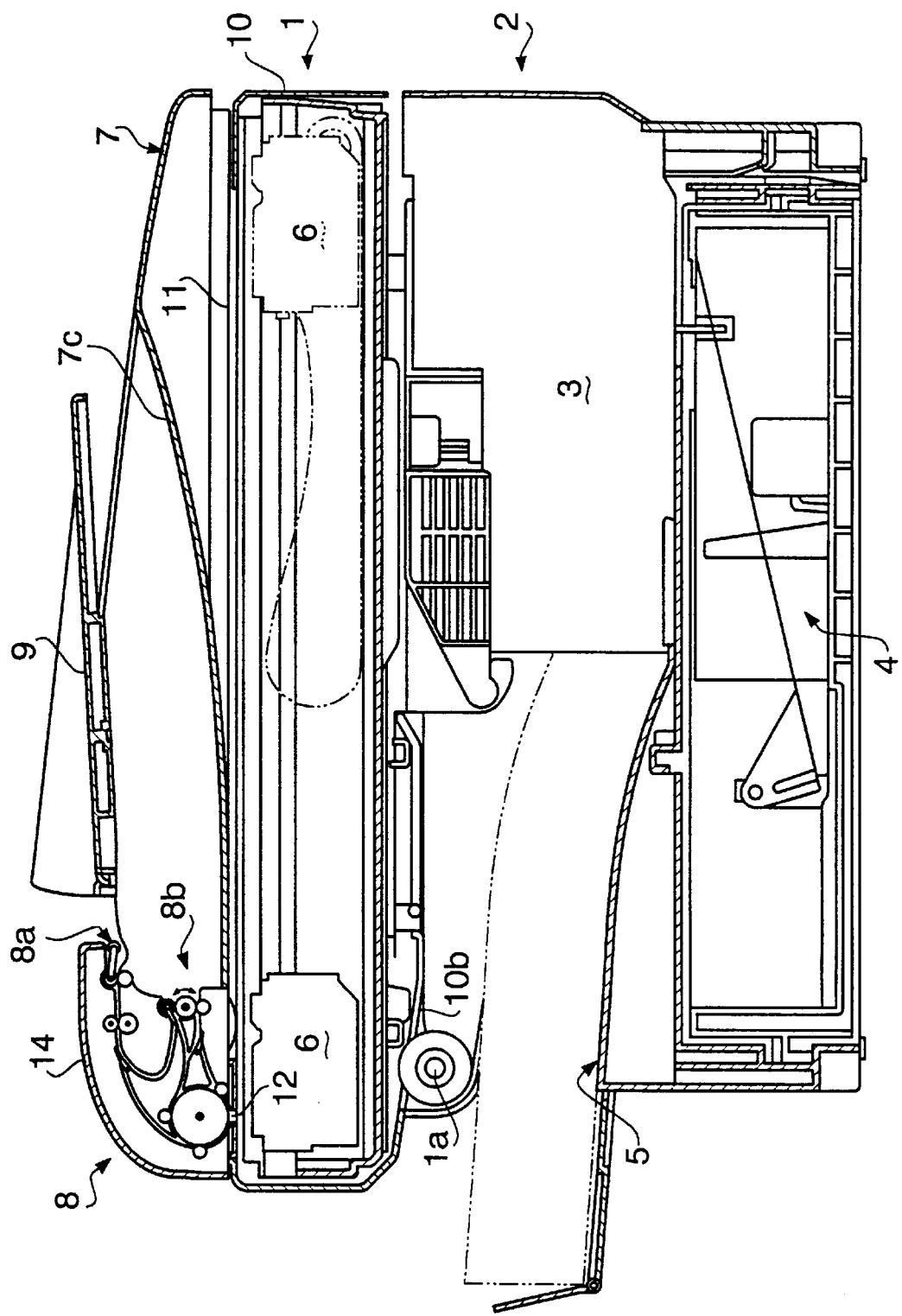
FIG. 2 illustrates a lateral cross sectional view of the facsimile machine shown in FIG. 1.

Referring to FIGS. 1 and 2, illustrated is a facsimile machine that includes a scanner part 1 and a printer part 2 below the scanner part. The printer part 2 includes a printer module 3 and a paper cassette 4 below the printer module. Sheets stacked in the paper cassette 4 are transferred to the printer module 3, and discharged onto a discharge tray 5 after printing.

The scanner part 1 has a casing 10, and a hinge 10b extending from a lower surface of the casing 10 engages on a hinge pin 1a of the printer part 2. The scanner part 1 can therefore pivot up and down relative to the printer par 2 about the hinge pin 1a.

The scanner part 1 includes a scanner module 6 in the casing 10. A transparent stationary document loading bed 11 lies over the casing 10. An original document placed on the transparent bed 11 is scanned by the scanner module 6 that moves from a start position indicated by the solid line to an end position indicated by a phantom line in FIG. 2.

A document cover 7 lies over the bed 11 such that it can pivot up and down about one edge thereof. The original document situated on the transparent bed 11 is pressed by the document cover 7 from the top.

An automatic document feeder (ADF) 8 is attached near the edge of the document cover 7. An outer contour or appearance of ADF 8 is defined by the document cover 7 and a pair of side frames 7a and 7b as shown in FIG. 1. The document cover 7 and side frames 7a, 7b are arranged side by side in a direction perpendicular to the scanning direction. Between the side frames 7a and 7b, disposed is an ADF cover 14 that covers a main mechanism of ADF 8. The ADF cover 14 is openable. Metallic plates (not shown) stand inside the side frames 7a and 7b such that they support ends of feed rollers. The cover 7 and one or both of the side frames 7a and 7b house in combination a drive source (e.g., motor) adapted to rotate drive rollers (e.g., paper feed rollers) and associated parts such as chains, sprockets, gears, etc.

ADF 8 includes an outer frame constituted by the cover 7 and side frames 7a and 7b, and a document feeder part located inside the outer frame and covered with the ADF cover 14.

An original paper feed tray 9 is disposed above the document cover 7 such that it continues to a paper inlet 8a of ADF 8. An original paper discharge tray 7c lies below the original paper feed tray 9. This tray 7c defines an upper surface of the document cover 7 and is continuous to an outlet opening 8b of ADF 8, which opens below the paper inlet 8a. Thus, a paper path is formed inside ADF 8 such that it extends from the paper inlet 8a to the outlet 8b.

Figure 3:
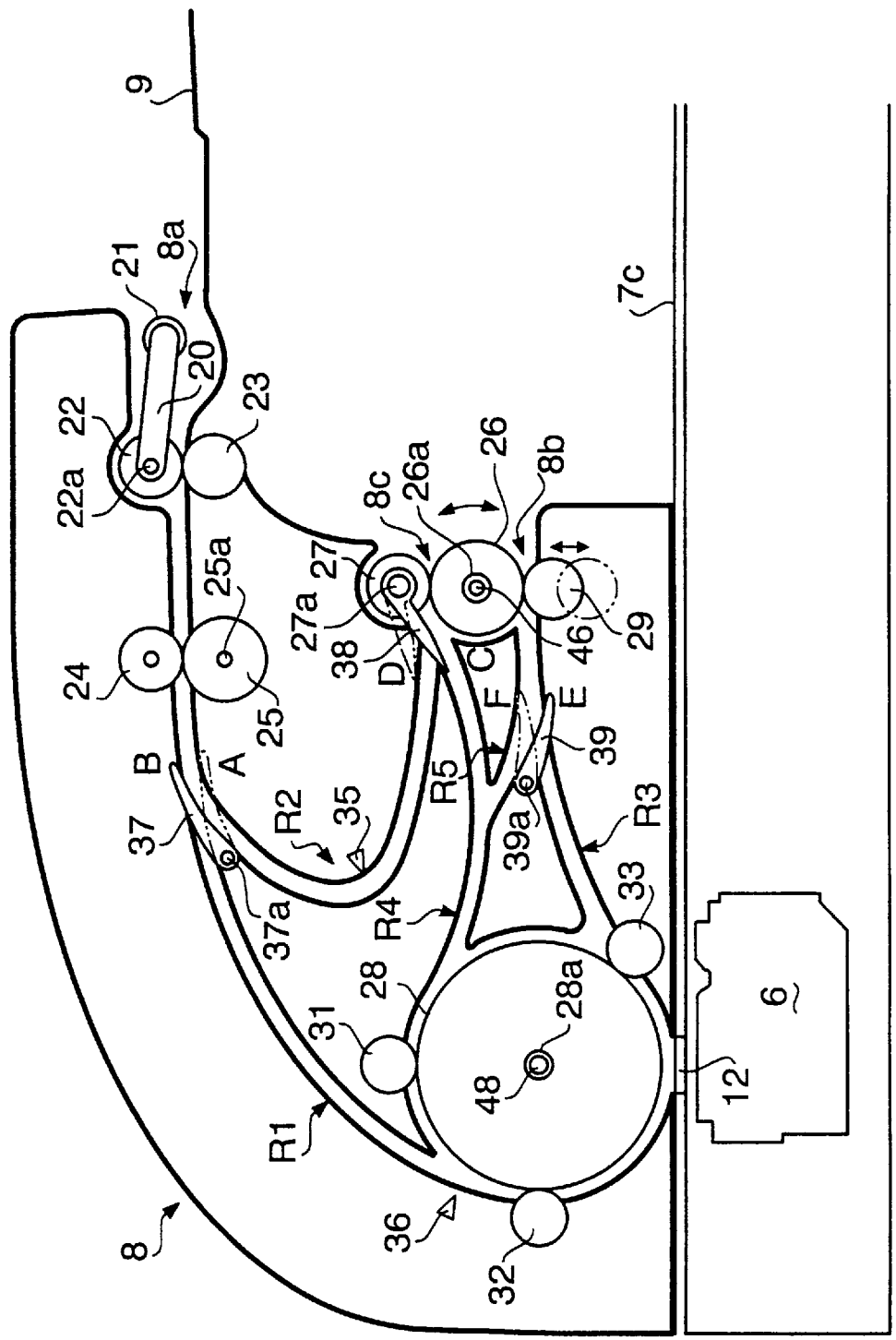
FIG. 3 illustrates an enlarged lateral cross sectional view of ADF used in the facsimile machine shown in FIG. 1.

Referring to FIG. 3, original sheets piled on the feed tray 9 are picked up by the feed roller 21 and transmitted to the paper inlet 8a. When the sheets are transported to a separate roller 22 and a retard roller 23, they are separated sheet by sheet and further transported along the paper path by the separate roller 22, feed roller 25 and giant feed roller 28 up to a platen glass 12. The original sheet passing over the platen glass 12 is scanned by the scanner 6 which is situated at the initial position as indicated by the solid line. The original sheet is then transmitted to the discharge tray 7c through the discharge opening 8b.

The scanner part 1 can therefore be used as a flat bed scanner that scans a stationary original document with a moving scanner 6 and a sheet feed scanner that scans a moving original document with a stationary scanner 6.

Referring to FIG. 1, the scanner casing 10 has an operation panel 13 with a number of keys and buttons. By pressing these keys, a user can instruct the machine to scan an original document and enter a facsimile (or telephone) number so as to transmit the scanned image to a remote machine via facsimile. The user is also able to instruct the printer 3 to print the scanned image. Of course, the user can instruct the machine to perform other functions.

The inside structure of ADF 8 will be described. In the following description in reference to FIG. 3, the "forward position" is a position of the paper inlet 8a or that of the outlet 8b (i.e., rightward position), and the "backward position" is a position of a 180-degree turning portion of the paper path (i.e., leftward position). The original paper moves from the forward position (8a) toward the backward position and returns to the forward position (8b). Directions perpendicular to the drawing sheet are right and left directions. It should be assumed that the ADF cover 14 is closed and nothing is placed on the transparent bed 11 with the document cover 7 put on the top of the scanner casing 10 as shown in FIG. 2 unless otherwise mentioned.

First, the paper path will be described. As shown in FIG. 3, a first "C" shaped paper path R1 extends from the paper inlet 8a to a roller 33 in ADF when viewed laterally, and a discharge path R3 extends from the roller 33 (or platen glass 12) to the paper outlet 8b. Downstream of the separate roller 22, provided are feed rollers 24 and 25 for transmitting the original paper in the first paper path R1 from the nip between the separate roller 22 and retard roller 23. A roller 27 is a first press roller.

A feed roller 28 is disposed at the end of the first paper path R1 and the beginning of the discharge path R3. The feed roller 28 is on the platen glass 12. An extra roller 26 and a second press roller 29 are disposed at the end of the paper discharge path R3. These rollers 26 and 29 contact each other.

A return path R4 extends from the end of a second paper path R2 towards the feed roller 28 and connects to the first paper path R1. A conjunction path R5 extends from the end of the discharge path R3 and meets the return path R4. The second press roller 29 is lifted up and down by a cam mechanism (not shown) so that it can contact and leave the extra roller 26.

The second paper path R2 serves as an inverting means for turning the document upside down prior to scanning when the document is fed from the paper inlet 8a. The extra roller 26 and first press roller 27 is a transportation means for transporting the turned document in a reverse direction such that the document reaches the platen glass 12. The giant feed roller 28 and slave rollers 31 to 33 constitute in combination a guide means for introducing the original document to the platen glass 12. The extra roller 26 and second press roller 29 serve as a reverse feeding means for reversing the transportation direction of the original document after one side of the original document is scanned on the platen glass 12, such that the original document is transported to the platen glass 12 again.

The rollers 22, 25, 26 and 28 are driven by the drive source(s) and associated power transmission mechanism(s) disposed in one or both of the side frames 7a and 7b. Thus, these rollers 22, 23, 25, 26 and 28 are drive rollers, and the rollers 24, 27, 29, 31, 32 and 33 are trailing or driven rollers.

A first guide member 37 is installed at a position downstream of the nip between the slave feed roller 24 and master feed roller 25, i.e., at a branching position of the first and second paper paths R1 and R2. The first guide member 37 can pivot up and down about a pivot center (shaft) 37a so that one of the paper paths R1 and R2 is blocked by the first guide member 37 and the paper can proceed in the other paper path. When a user presses certain function keys 18 and/or other keys on the control panel 13 (FIG. 1) to bring the machine into a one-side scanning mode, the first guide member 37 pivots downwards to a lower position A, and the document is transmitted to the first paper path R1. On the other hand, when a user selects a both-side scanning mode, the first guide member 37 pivots to an upper position B, and the document is introduced to the second paper path R2.

On the shaft 27a of the first press roller 27, disposed is a second guide member 38 that can pivot to a lower position C or an upper position D. The position C interrupts passage of the document, and the position D allows passage.

Between the extra roller 26 and giant feed roller 28, the third paper path R3 and return path R4 are connected to each other by a fifth paper path R5. A third guide member 39 is provided below the fifth paper path R5. The third guide member 39 pivots up and down about a shaft 39a so as to control passage of the document. Specifically, when the third guide member 39 is moved to a lower position E, the third paper path R3 is closed, and the document is forced to move in the fifth paper path R5. When the third guide member 39 is moved to an upper position F, on the other hand, the fifth paper path R5 is closed and the document moves in the third paper path R3.

The third guide member 39 may be a flexible member such as film. It is also satisfactory that the third guide member 39 is closed and opened by its deadweight.

A first position sensor 35 is disposed on the second paper path R2 between the nip of the slave feed roller 24 and master feed roller 25 and the nip of the extra roller 26 and first press roller 27, and a second position sensor 36 is disposed near a merge of the first paper path R1 and return path R4 so as to detect the paper passing thereover respectively.

A first angle sensor 46 is incorporated in a rotating shaft 26a of the extra roller 26, and a second angle sensor 48 is incorporated in a rotating shaft 28a of the giant feed roller 28 so as to detect angular positions of the respective rollers.

A controller 40 of the image scanning machine will now be described.

Figure 7:
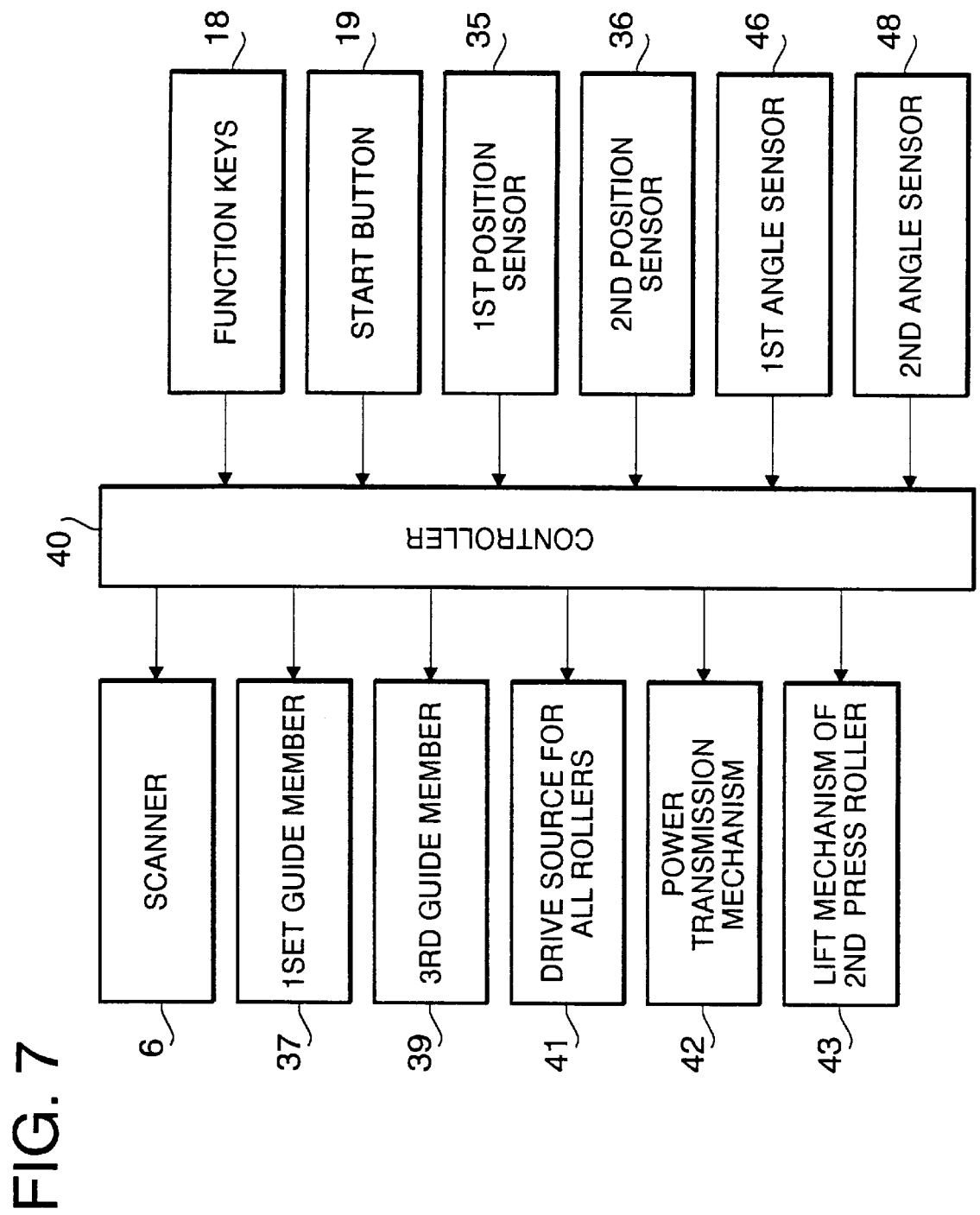
FIG. 7 is a block diagram of the image scanning device.

Passage of the document is controlled by the controller 40 shown in FIG. 7. The controller 40 is connected to sensors and other elements as described below.

Each of the sensors 35 and 36 is an optical sensor or limit switch, that includes a light emitting element located on one side of the paper path and a light receiving element on the other side. Each of these sensors detects the passing period of the document and issues a control signal (detection signal) to the controller 40.

Each of the sensors 46 and 48 is an angular sensor such as a potentiometer, and detects an angular position of the associated roller. When the roller comes to a certain angular position, the sensor issues a detection signal to the controller 40.

The guide rollers 37 and 39 receive control signals (switching signals) from the controller 40 and are caused to move to the upper or lower positions respectively so as to change the moving direction of the document.

The drive source 41 and associated power transmission mechanism 42 for the rollers 22, 23, 25, 26 and 28 activate or deactivate these rollers on the basis of control signals from the controller 40. In particular, the extra roller 26 can be rotated in both directions.

A lift mechanism of the second press roller 29, which includes a cam mechanism and other elements, can move up and down in accordance with control signals from the controller 40.

The control panel 13 shown in FIG. 1 includes the function keys 18 for selecting a scanning mode such as the one-side or both-side scanning mode, a start button 19 for starting the scanning operation, a stop button 16 for discontinuing the scanning operation while a plurality of sheets are being scanned, and other keys. As a user presses these keys, a control signal is sent to the controller 40.

Figure 8:
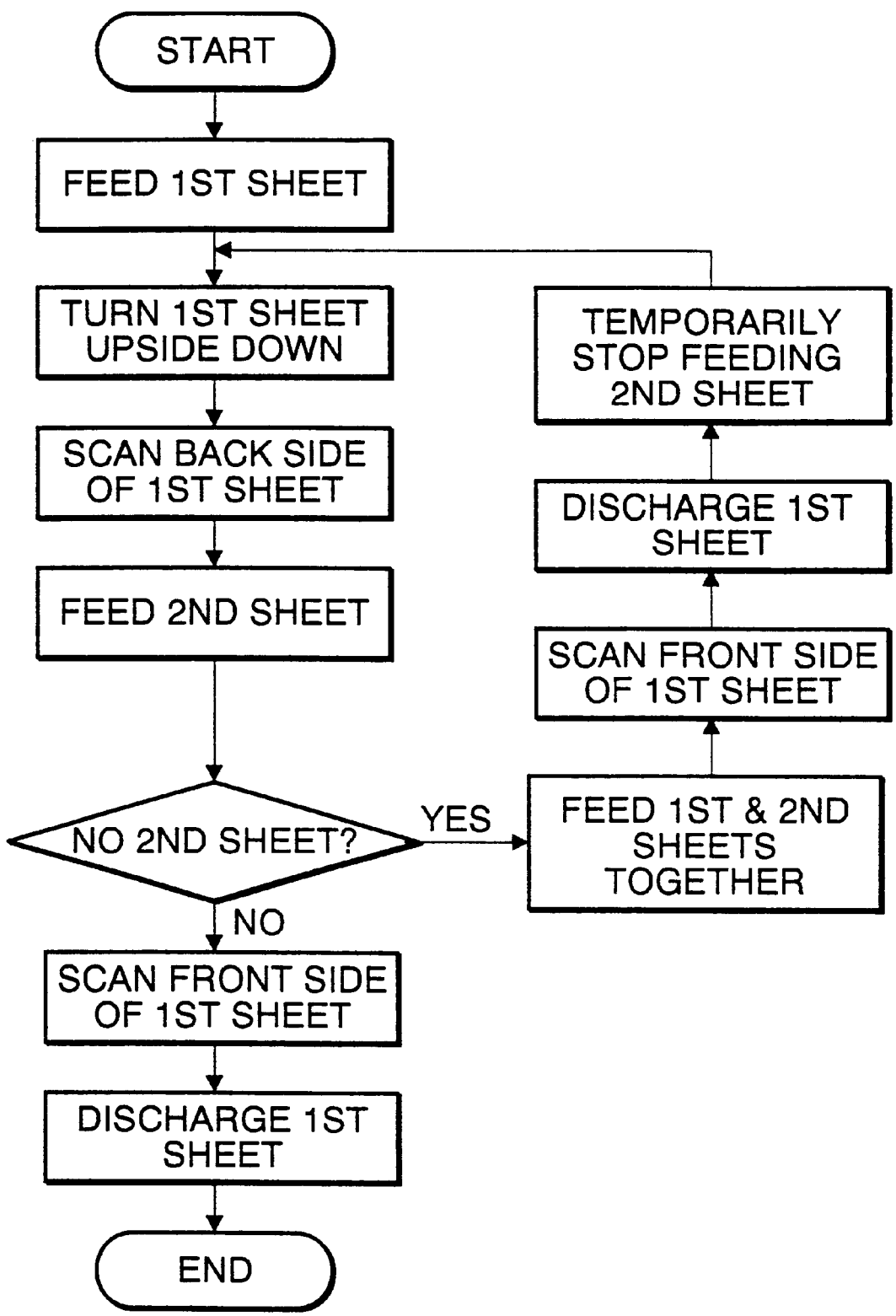
FIG. 8 is a flowchart showing an operation of the image scanning device according to the first embodiment.
Figure 9:
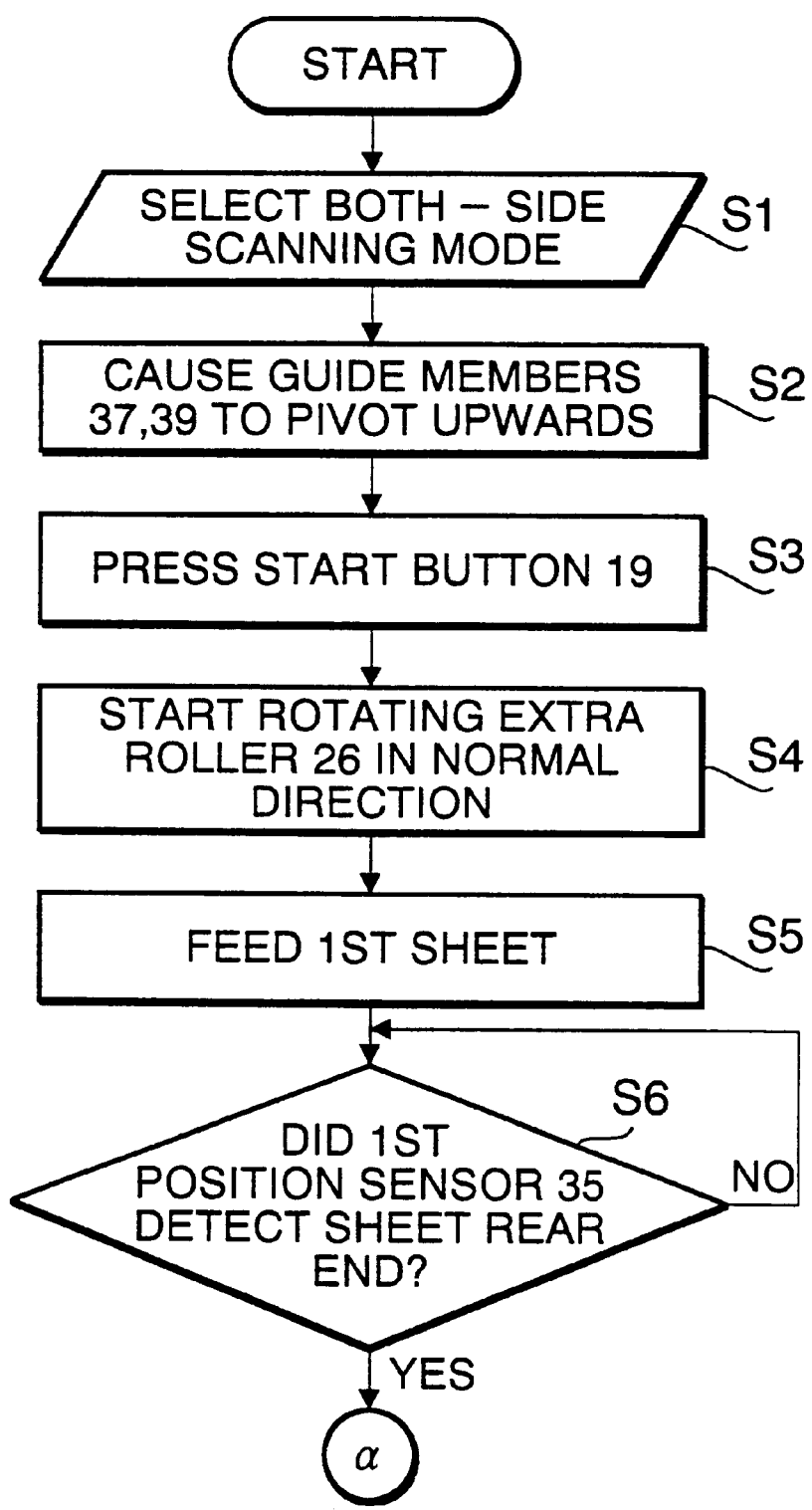
FIG. 9 is a flowchart particularly illustrating an initial stage of the operation of the image scanning device.

Referring now to FIGS. 8 and 9, will be described a document turning mechanism.

As shown in FIG. 9, a user first loads an original document into the paper tray 9, with the front side of the document being up. The user then operates the function keys 18 to select the both-side scanning mode (Step S1). The controller 40 produces and sends a control signal to the guide members 37 and 39 such that the guide members 37 and 39 are moved to the upper positions B and F respectively (Step S2).

When the use presses the start button 19 on the control panel 13 (Step S3), the controller 40 issues a control signal to the drive 41 and transmission mechanism 42 of the extra roller 30 and other rollers 22, 25, 26 and 28. The extra roller 26 is then caused to rotate in a normal direction (clockwise in FIG. 3) (Step S4), and the pick-up roller 21, separate roller 22 and retard roller 23 cause the uppermost sheet (first original document) to separate from the paper stack and proceed into the paper path through the paper inlet 8a. This original document is further transported by the master feed roller 25 and slave feed roller 24 into the second paper path R2 (Step S5).

When the first original document reaches the paper exit 8c, it is moved to a space above the discharge tray 7c by the extra roller 26 and first press roller 27. As the first position sensor 35 detects passage of the end of the first original document (Step S6), it issues a detection signal to the controller 40. Then, the controller 40 outputs a control signal to the extra roller 26 such that the extra roller 26 rotates in a reverse direction.

Figure 10:
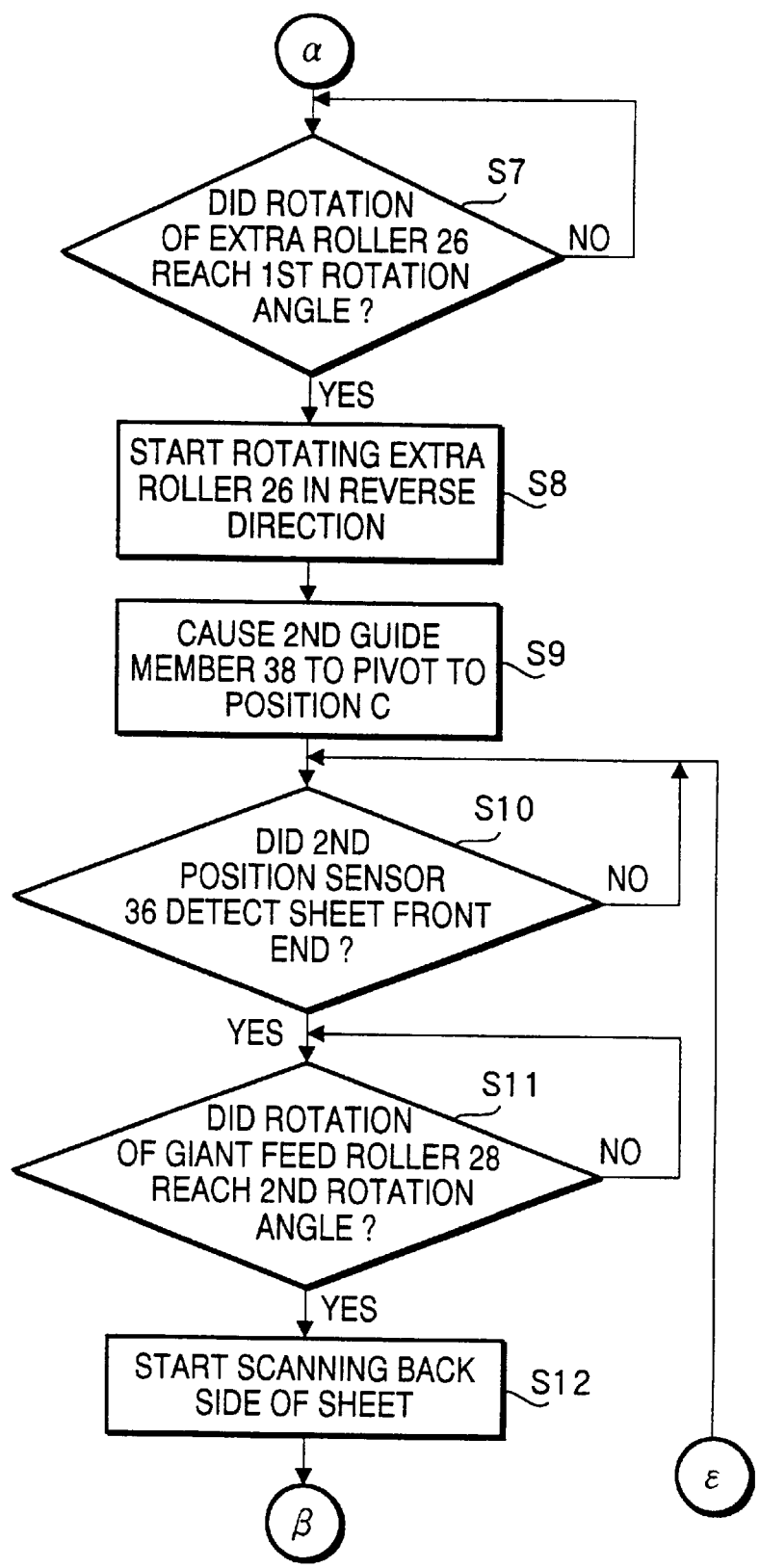
FIG. 10 is a flowchart showing a second stage of the operation of the image scanning device.

When the first position sensor 35 detects the complete passage of the first original sheet, the controller 40 further controls the rotation (first rotation angle) of the extra roller 26 such that the end of the first original sheet is moved from the position of the first position sensor 35 to a position between the second guide member 38 and the nip of the extra roller 26 and first press roller 27. As shown in FIG. 10, specifically, after the first angular sensor 46 detects the first rotation angle (Step S7) and most of the first original sheet is discharged from the paper exit 8c, the extra roller 26 is rotated in the reverse direction (counterclockwise in FIG. 3) (Step S8). In this situation, the end of the first original sheet is only nipped with the extra roller 26 and first press roller 27. Simultaneously, the second guide member 38 is switched to the lower position C such that the original sheet can be introduced to the return path R4 (Step S9). The original sheet is transported in the opposite direction by the extra roller 26 and first press roller 27.

The first original sheet that moves backwards is caught by the giant feed roller 28 and first press roller 31. When the "front" end (this end is the "rear" end previously) of the first original sheet is detected by the second sensor 36 (Step S10), a detection signal is sent to the controller 40. The controller 40 then instructs the scanner 6 to start the scanning operation.

As the second position sensor 36 detects passage of the front end of the first original sheet, the controller 40 uses the second angular sensor 48 to calculate a rotation angle (second rotation angle) of the giant feed roller 28 corresponding to the moving distance of the front end of the sheet from the position of the second sensor 36 to the rear end of the platen glass 12. When this second rotation angle is reached (Step S11), the scanning of the back side of the first original sheet is started (Step S12).

Figure 11:
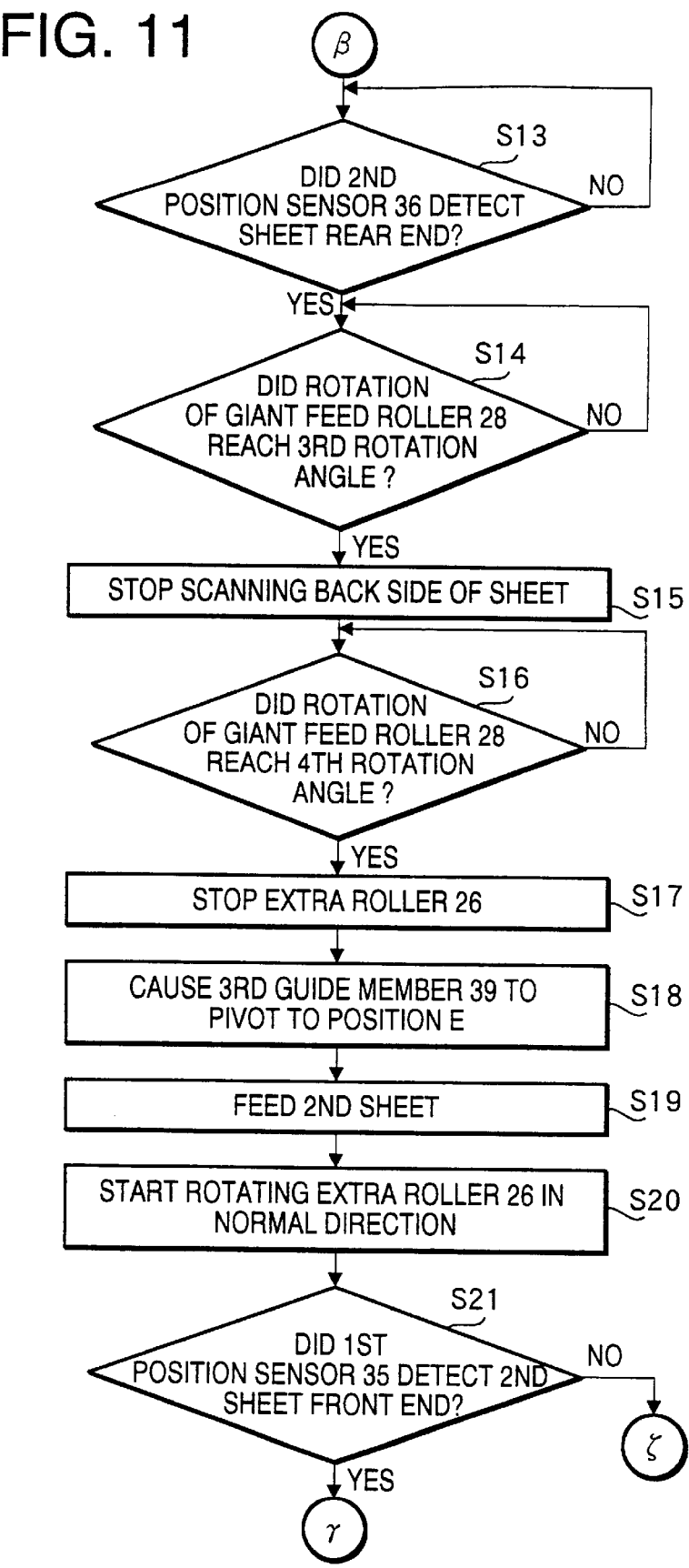
FIG. 11 illustrates a third stage of the operation.

As illustrated in FIG. 11, the first original sheet is moved by the giant feed roller 28 and second slave roller 32 or third slave roller 33. When passage of the rear end of the first original sheet is detected by the second positional sensor 36 (Step S13), the detection signal is sent to the controller 40. The controller 40 then issues a control signal to the scanner 6 to terminate the scanning. After that, the controller 40 issues control signals to the extra roller 26, third guide roller 39 and the power transmission mechanism 42 of the drive source 41 respectively.

As the second position sensor 36 detects the complete passage of the first original sheet, the controller 40 uses the angular sensor 48 to measure a rotation angle (third rotation angle; greater than the second rotation angle) of the giant feed roller 28 corresponding to the moving distance of the sheet rear end from the second position sensor's position to the front end of the platen glass 12, and a rotation angle (fourth rotation angle) of the giant feed roller 28 corresponding to the moving distance of the sheet rear end from the second position sensor's position to a mid point between the third guide member 39 and the nip of the extra roller 26 and second press roller 29. When the third rotation angle is reached (Step S14), the scanning of the back side of the first original sheet is finished (Step S15).

When the fourth rotation angle is detected by the angular sensor 38 (Step S16), most of the first original sheet is discharged from the exit 8b and the rear end of the sheet is only nipped between the extra roller 26 and the second press roller 29. At this point, the extra roller 26 is caused to stop rotating (Step S17). Further, the third guide member 39 is switched to the lower position E in order not to allow the sheet to move reversally toward the third slave roller 33 (Step S18).

In this situation, the pick-up roller 21, separate roller 2 and retard roller 23 pick up a currently uppermost sheet (second original sheet) from the paper stack and feed it into the paper path from the inlet 8a (Step S19). The extra roller 26 starts rotating in the normal direction (clockwise in FIG. 3) (Step S20). This sheet is further transported by the master feed roller 25 and slave feed roller 24 so that the sheet reaches the second paper path R2. Here, the front end of the second original sheet is detected by the first position sensor 35 (Step S21), and the sheet is further transported by the extra roller 26 and first press roller 2, such that it is discharged from the exit 8c into the space above the discharge tray 7c.

As the extra roller 26 rotates in the normal direction at Step S20, the first original sheet is also transported backwards; it moves in the fourth paper path R4 and caught by the giant feed roller 28 and first slave roller 31. When the front end of the first original sheet (this end is the rear end before the second backward movement, i.e., the front end at the time of loading into the paper inlet 8a is again the front end) is detected by the second position sensor 36 (Step S22), the detection signal is sent to the controller 40. The controller 40 then instructs the lift mechanism 43 of the second press roller 29 to move down and the scanner 6 to scan the sheet. The controller 40 then immediately instructs the third guide member 39 to move to the opposite position.

In this manner, the second press roller 29 is moved down so that it is separated from the extra roller 26 (Step S23). If the length of the sheet is greater than the total lengths of the paper paths R5, R4 and R3, the front end of the sheet reaches or returns to the rollers 26 and 29 when the rear end of the same sheet is still nipped between the rollers 26 and 29. In order to allow the front end of the sheet to move further, the rollers 26 and 29 are spaced from each other. After Step S23, the sheet front end can smoothly pass between the rollers 26 and 29. The sheet is transported by the rollers 28 and 31 even after a gap is created between the rollers 26 and 29.

The controller 40 causes the angular sensor 48 to count the rotation angle of the giant feed roller 28 upon detecting the front end of the first original sheet by the second position sensor 36. When the second rotation angle is reached (Step S24), the scanning of the front side of the first original sheet begins (Step S25). The controller 40 soon issues a control signal to the third guide member 39 such that the third guide member moves to the upper position F (Step S26).

After that, the first original document is transported by the giant feed roller 28 and second slave roller 32 or third slave roller 33. When the second position sensor 36 detects passage of the rear end of the first original document (Step S27), the controller 40 causes the angular sensor 48 to measure the rotation angle of the giant feed roller 28. When the third rotation angle is reached (Step S28), a control signal is issued to the scanning unit 6 to stop the scanning so that the scanning of the front side of the first original document is complete (Step S29).

Figure 13:
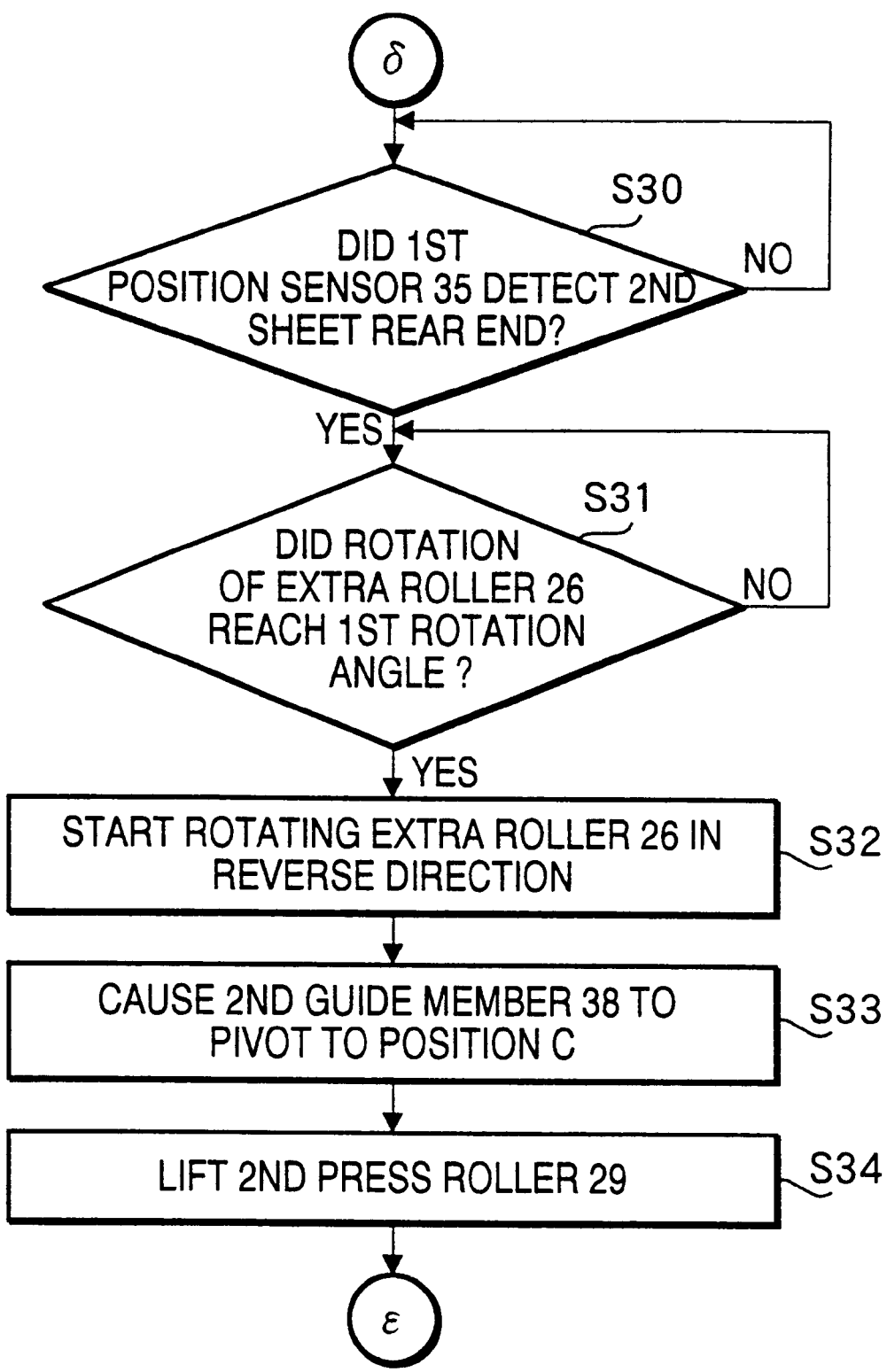
FIG. 13 illustrates a second half of the control loop.

While the first original document is being scanned, the second original document is transported in the second paper path R2 toward the exit 8c. As shown in FIG. 13, when passage of the rear end of the second original document is detected by the first position sensor 35 (Step S30), a detection signal to sent to the controller 40. The controller 40 then issues a control signal to the extra roller 26 and the lift mechanism 43 of the second press roller 32.

Upon receiving the detection signal indicative of the passage of the rear end of the first original document from the first position sensor 35, the controller 40 causes the first angular sensor 46 to measure the rotation angle of the extra roller 36. When the measured rotation angle reaches the first rotation angle (Step S31), most of the second original document is discharged from the paper exit 8c and the rear end of the second original document is only nipped between the extra roller 26 and first press roller 27. In this situation, the extra roller 26 is caused to rotate in the reverse direction (counterclockwise in FIG. 3) (Step S32), and at the same time the second guide member 38 is switched to the lower position C in order to feed the second original document in the return path R4 (Step S33). The second original document is moved backwards by the extra roller 26 and first press roller 27, and the second press roller 32 is moved up to contact the extra roller 26 (Step S34).

The program returns to Step S10 to perform the scanning operation to the second original document. The scanning operation itself is the same as that applied to the first original document.

The first original document is further transported towards the discharge tray 7c by the extra roller 26 and second press roller 29 since the extra roller 26 starts rotating in the reverse direction at Step S32.

In this manner, as the front side of the preceding document is scanned completely, the scanning to the back side of the current original document is immediately initiated. Thus, a plurality of documents are successively scanned. It should be noted, however, that the flowchart for transportation of the last original document is different.

Specifically, when the program arrives at Step S21 in FIG. 11 for the last original sheet, the first position sensor 35 does not function since there is no next sheet. Thus, the program ends when the front side of the last original sheet is completely scanned. If the first original sheet is the last original sheet, the program executes the below described process after executing Steps S1 through S21.

Figure 14:
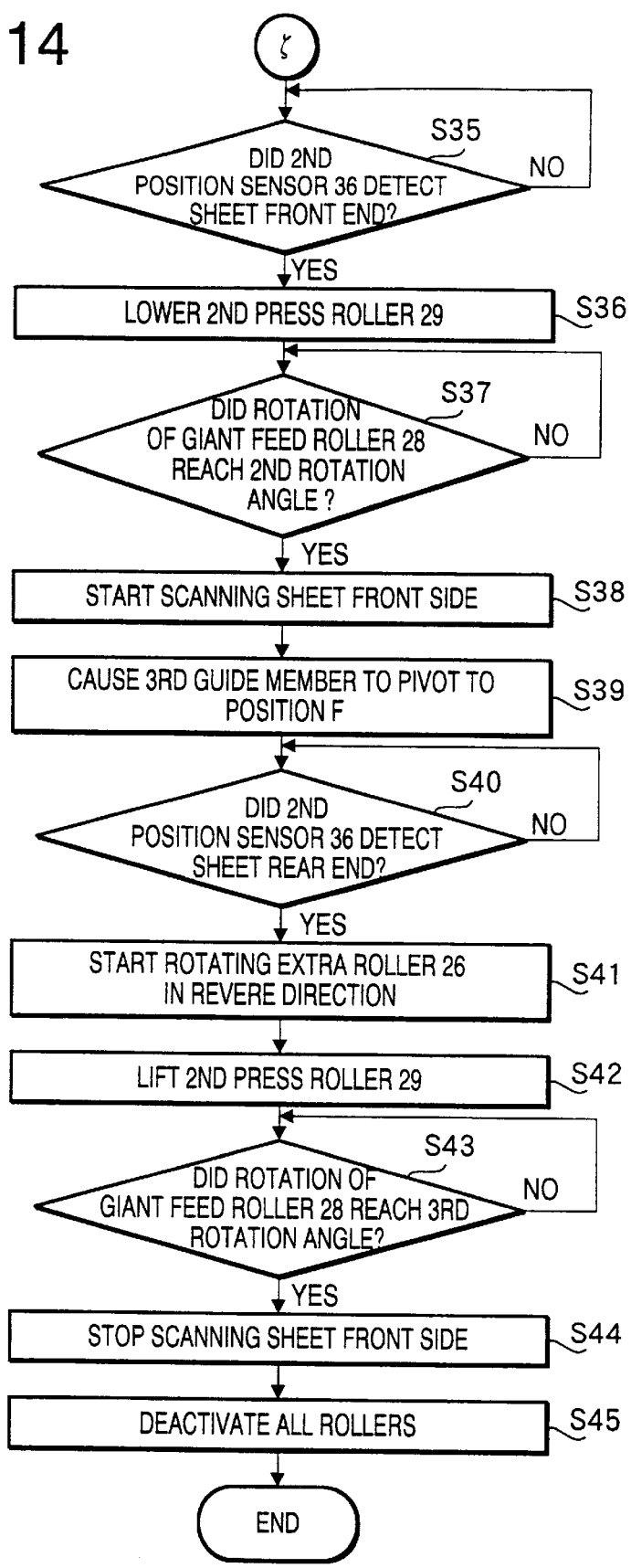
FIG. 14 illustrates a final stage of the operation.
Figure 16:
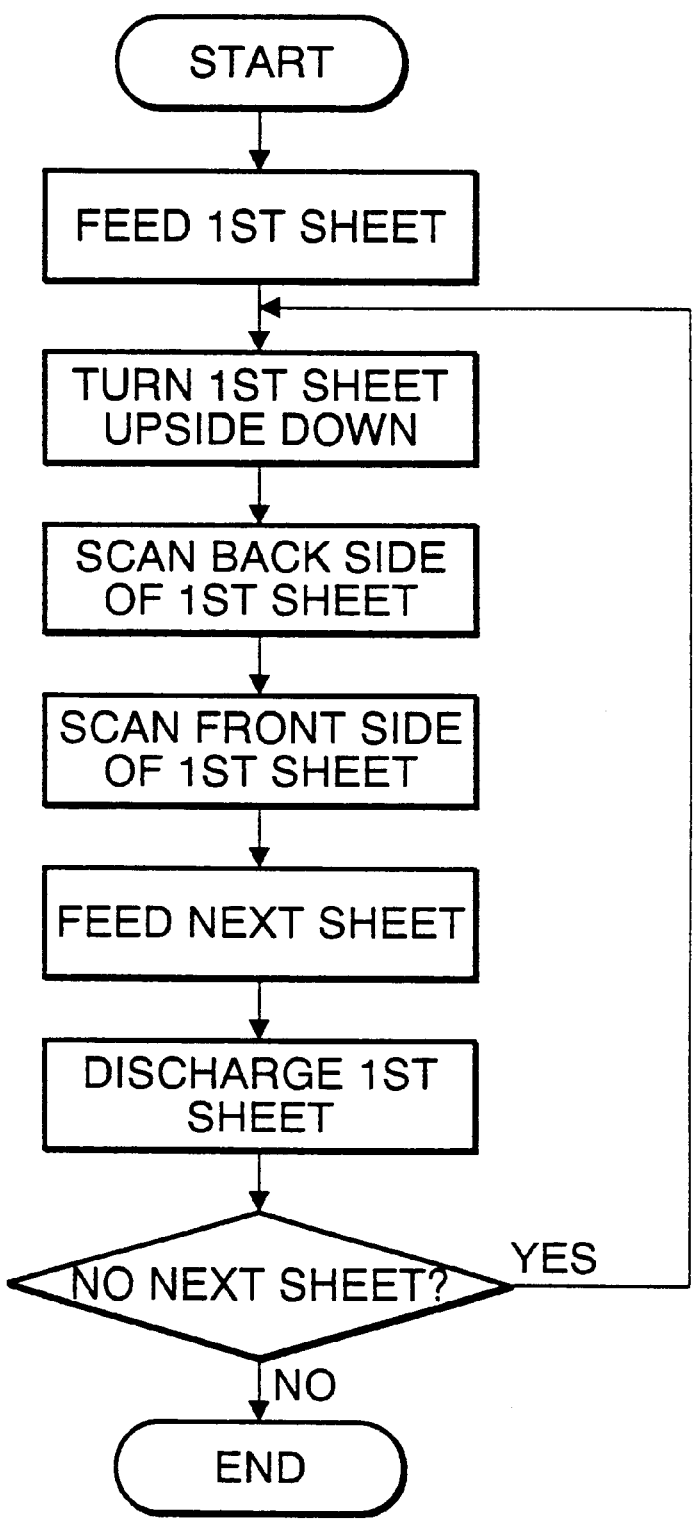
FIG. 16 illustrates a flowchart of an operation performed by an image scanning device of the second embodiment.

A flowchart for the last original sheet will be described. For example, if the first position sensor 35 does not detect passage of the original sheet within a predetermined period (Step S21), i.e., while the controller 40 measures the fourth rotation angle of the giant feed roller 28 with the angular sensor 48 at Step S16 in FIG. 11, and further measures a predetermined angle, then the last original sheet moved backward at Step S20 proceeds in the fifth paper path R5 and is transported by the giant feed roller 28 and first slave roller 31. When the front end of the last original sheet is detected by the sensor position sensor 6 (Step S35), a detection signal is output to the controller 40 as shown in FIG. 14. The controller 40 instructs the second press roller lift mechanism 43 to move downward and the scanner 6 to start scanning. Immediately thereafter, the controller 40 instructs the third guide member 39 to switch to the other position.

The second press roller 29 is lowered so that the extra roller 26 is separated from the second press roller 29 (Step S36).

The controller 40 measures the rotation angle of the giant feed roller 28 using the angular sensor 48 as the second position sensor 36 detects the front end of the last original sheet. When the second rotation angle is reached (Step S37), the scanning of the front side of the last original sheet is started (Step S38). The controller 40 immediately issues a control signal (switching signal) to the third guide member 39 such that the third guide member 39 moves to the upper position F (Step S39).

The last original sheet is transferred by the giant feed roller 28 and second slave roller 32 or third slave roller 33. When the second position sensor 36 detects passage of the rear end of the last original sheet (Step S40), a detection signal is sent to the controller 40. The controller 40 then issues control signals to the extra roller 36 and second press roller lift mechanism 43 (lifting command) and issues a control command to the scanner 6 (scanning termination command).

The extra roller is caused to rotate in the reverse direction (counterclockwise in FIG. 3) (Step S41) and the second press roller 29 is moved upward such that it contacts the extra roller 26 again (Step S42). When the second position sensor 36 detects passage of the rear end of the first original sheet, the controller 40 measures the rotation angle of the giant feed roller 28 using the angular sensor 48. When the third rotation angle is reached (Step S43), the scanning to the last original sheet is completed (Step S44).

The last original sheet is then moved to the discharge tray 7c by the extra roller 26 and second press roller 29.

Finally, the controller 40 stops all the rollers after a predetermined period (Step S45). Specifically, the controller 40 deactivates the rollers after it measures the fourth rotation angle of the giant feed roller 28 with the angular sensor 48 and further measures a predetermined rotation.

Because the sheet is turned upside down at the initial stage of the sheet transportation process prior to the scanning, and then fed to the scanner 2, the sheet is required to pass over the platen glass 12 only twice. As a result, the total scanning period needed to scan both sides of the sheet is reduced. Further, the sheet placed on the feed tray 9 with its front side up, but its back side is first scanned. Then, the sheet is turned upside down and its front side undergoes the scanning. The sheet is discharged onto the discharge tray with its front side down. A next sheet is stacked on the first sheet. Thus, the sheets are piled up on the discharge tray in the decent order, i.e., page 2 of the first sheet contacts page 3 of the second sheet.

The sheet fed from the feed tray 9 is turned upside down when it proceeds in the second paper path R2. The sheet is then transported backwards by the extra roller 26 and second press roller 29 and proceeds in the return path R4 such that it advances to the platen glass 12 (i.e., scanner). The sheet is further nipped by the giant feed roller 28 and slave rollers 31, 32 and 33 and guided properly to the platen glass 12. Therefore, the sheet does not approach the platen glass 12 from the upper diagonal direction. This prevents degraded scanning and jamming.

If the original sheet is long, the front and rear ends of the original document after the first side scanning are transported by the extra roller 26 and second press roller 29 (both of them are the reversing means) and the extra roller 21 and first press roller 27 (both of them are the transportation means). After the second side scanning, on the other hand, the front and rear ends of the original sheet are transported by the extra roller 26 and second press roller 29 (both of them are the reversing means). Further, the transportation directions are opposite each other. In the illustrated embodiment, therefore, the extra roller 26 and first press roller 27 (transportation means) are made always contact each other whereas the extra roller 26 and second press roller 29 (reversing means) can contact and leave each other.

In this manner, the extra roller 26 is separated from the second press roller 29, and the front and rear ends of the original sheet after the second side scanning are transported by other rollers 28, 31, 32, 33. The rollers 26 and 29 should be spaced from each other when the length of the sheet is greater than the total length of the paper paths R5, R4 and R3.

In order to cause the extra roller 26 and second press roller 29 to contact and leave each other, however, the lift mechanism 43 including the motors and cams or an electromagnetic lift mechanism including solenoids should be employed. This would raise the manufacturing cost.

In this embodiment, therefore, the lift mechanism 43 or the electromagnetic elevator is used to the minimum. Specifically, the extra roller 26 and second press roller 29 which constitute the reversing means are only made contact and separate. This contributes to the cost reduction.

The second guide member 38 located at the bifurcation of the second paper path R2 and return path R4 for switching the moving direction of the sheet will be described.

Figure 4:
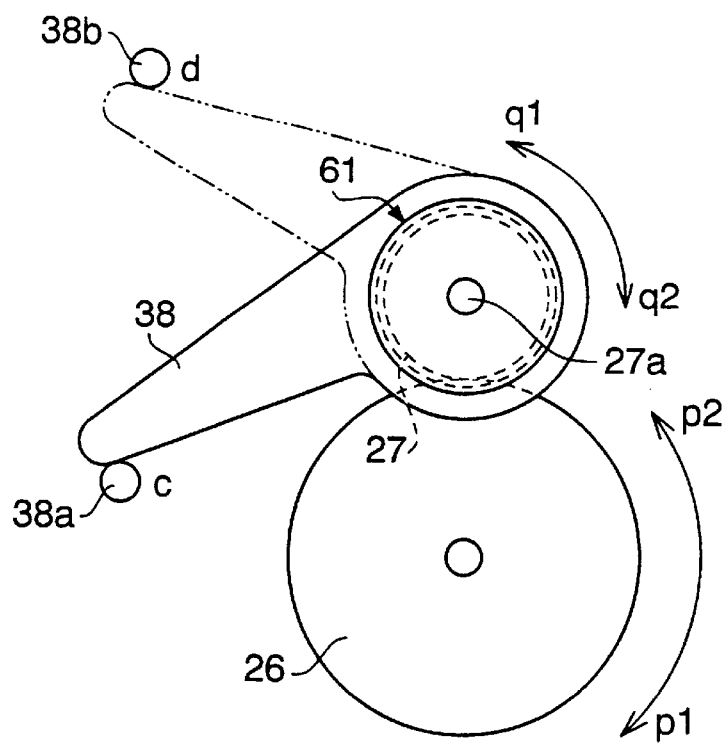
FIG. 4 illustrates a lateral view of a second guide member and associated elements.
Figure 5:
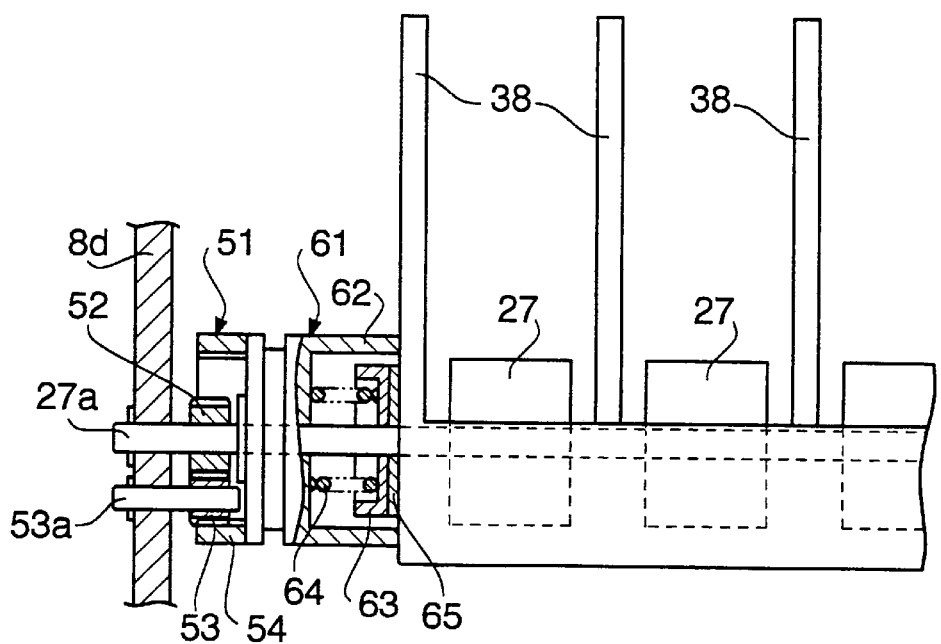
FIG. 5 illustrates a plan view of the second guide member and associated elements shown in FIG. 4.
Figure 6:
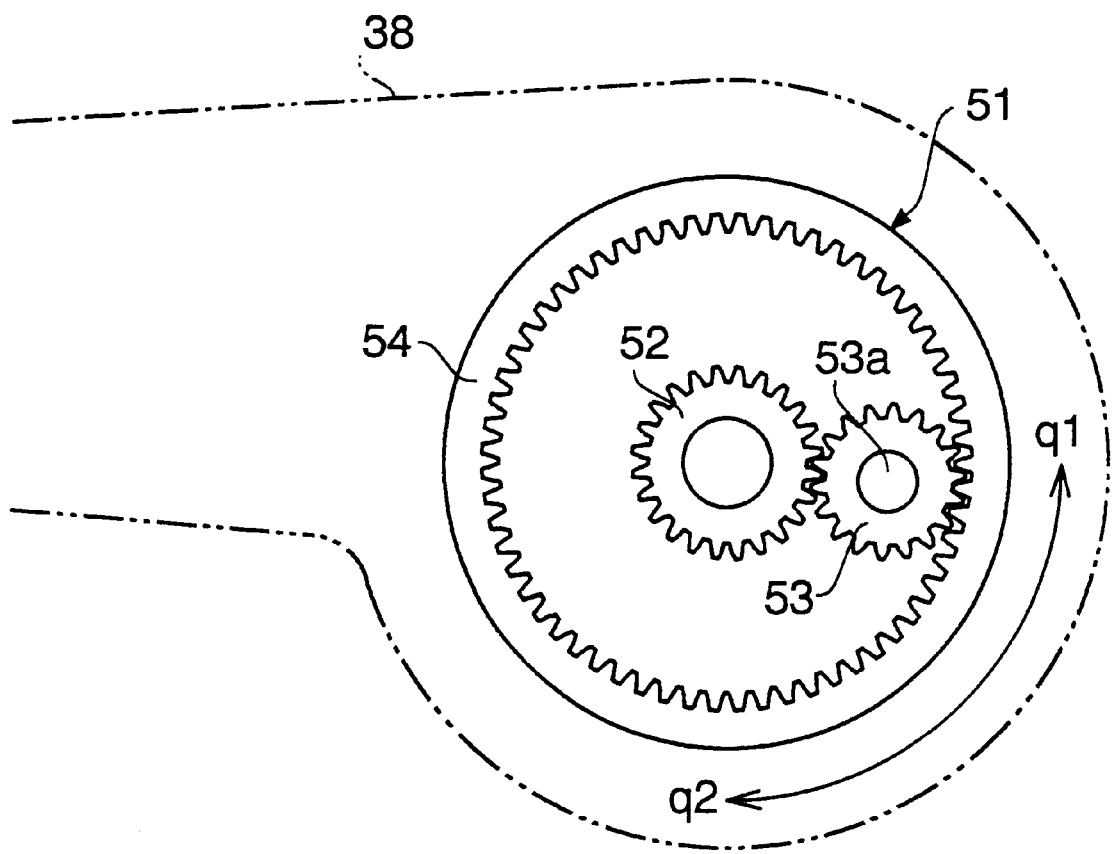
FIG. 6 illustrates a lateral view of a gear train.

Referring to FIGS. 4 to 6, the first press roller 27 in press contact with the rotating extra roller 26 rotates about the shaft 27a. The second guide member 38 is also pivotable about the roller shaft 27a. By this pivot movement, the second guide member 38 can move between the positions "c" and "d".

The first press roller 27 and roller shaft 27a rotate together, and the roller shaft 27a and second guide member 38 are operatively connected to each other by a gear assembly 51 and a torque limiter 61.

The gear assembly 51 includes a first gear 52 rotating with the roller shaft 27a, a second gear 53 engaging with the first gear 52 and a third gear 54 engaging with the second gear 53. The rotation center of the third gear 54 coincides with the roller shaft 27a. The third gear is an internal gear.

Ends of the roller shaft 27a are rotatably supported by the frame 8d of ADF 8, and a shaft 53a of the second gear 53 is also rotatably supported by the frame 8d.

In the gear train 51, the rotations of the roller shaft 27a, e.g., leftward rotations of the first gear 52, cause the second gear 53 in mesh with the first gear 52 to rotate rightwards, and the third gear 54 in mesh with the second gear 53 to rotate rightwards. That is, the first gear 52 and third gear 54 rotate in the opposite directions.

The torque limiter 61 includes a casing 62 rotatably supported by the roller shaft 27a, a biasing member 63 rotatably fitted on the roller shaft 27a inside the casing 62, a compression spring 64 located between the casing 62 and biasing member 63 for biasing the biasing member 63 to the second guide member 38, and a friction member 65 located between the biasing member 63 and second guide member 38.

The friction member 65 is forced against the lateral face of the second guide member 38 by the compression spring 64 and biasing member 63. The casing 62 of the torque limiter 61 is operatively connected to the third gear 54 of the gear train 51 such that they can rotate together.

The gear mechanism 51 and torque limiter 61 have the above described structures. When, for example, the extra roller 26 rotates in the direction p1 and the first press roller 27 trails and rotates in the direction q1, then the first gear 52 rotating with the roller shaft 27a rotates in the direction q1, and the third gear 54 rotating opposite the first gear 52 rotates in the direction q2 together with the casing 62 of the torque limiter 61. When the torque limiter casing 62 rotates in the direction q2, the biasing member 63 biased to the second guide member 38 by the compression spring 64 also rotates in the direction q2.

Between the biasing member 63 and second guide member 38, exerted is a constant friction force by the friction member 65. This friction force causes the second guide member 38 to rotate in the direction q2 (i.e., upwards) as the biasing member 63 rotates in the direction q2.

When the second guide member 38 pivots upwards and reaches the position "d", it hits an upper stop pin 38b (FIG. 4) located above and cannot move further upwards.

A force exerted by the upper stop pin 38b that prohibits the second guide member 38 from pivoting further upward is greater than an upward pivoting force applied to the second guide member 38 by the friction force from the friction member 65. Thus, the second guide member 38 stops pivoting at the position "d", and the biasing member 63 keeps rotating in the direction q2 together with the casing 62.

Specifically, as the extra roller 26 is caused to rotate in the direction p1 and the first press roller 27 is caused to rotate in the direction q1, the torque limiter 61 forces the second guide member 38 to pivot upwards from the position "c" to the position "d".

If the extra roller 26 rotates in the direction p2 and the first press roller 27 trails it and rotates in the direction q2, on the other hand, the third gear 54 of the gear train 51 rotates in the direction q1 together with the torque limiter casing 62, and the second guide member 38 pivots from the position "d" to the position "c" with the friction force of the friction member 65. The second guide member 38 abuts on the lower stop pin 38a provided below the second guide member 38 when it reaches the position "c".

As described above, the second guide member 38 pivots upwards from the position "c" to the position "d" as the extra roller 26 pivots in the direction p1, and pivots downwards from the position "d" to the position "c" as the extra roller 26 pivots in the direction p2. In this manner, the changing rotating direction of the extra roller 26 switches the pivoting direction of the second guide member 38 and closes/opens the second paper path R2.

Thus, the second guide member 38 pivots up and down depending upon the rotating direction of the extra roller 26, which serves as the roller for reversing the feeding direction of the original sheet, so as to open and close the second paper path R2. Consequently, the paper proceeds in the second paper path R2 or return path R4. The original sheet moving backward in the second paper path R2 eventually reaches the end of the second paper path, and then introduced to the scanner 6 through the return path R4. In order to cause the original sheet to proceed in the return path R4, changing the rotation direction of the extra roller 26 is only required. This simplifies the paper path switching operation.

Since the second guide member 38 and extra roller 26 are operatively connected to each other via the first press roller 27, gear train 51 and torque limiter 61, and the change of the pivoting direction of the second guide member 38 in accordance with the rotating direction of the extra roller 26 is realized by the mechanical structures such as the gear train 51 and/or torque limiter 61, it is not necessary to drive the second guide member 38 in synchronization with the extra roller 26 or other elements. In other words, electrical and electronic controls are not needed for the synchronous operation. Accordingly, a program control applied to the paper feed apparatus 12 can be simplified.

Therefore, the original sheet transported in the second paper path R2 can easily be transferred to the scanner 6.

The structure of ADF 8 according to a second embodiment of the present invention will now be described. It should be noted that similar reference numerals are used to designate similar elements in the first and second embodiments.

Figure 15:
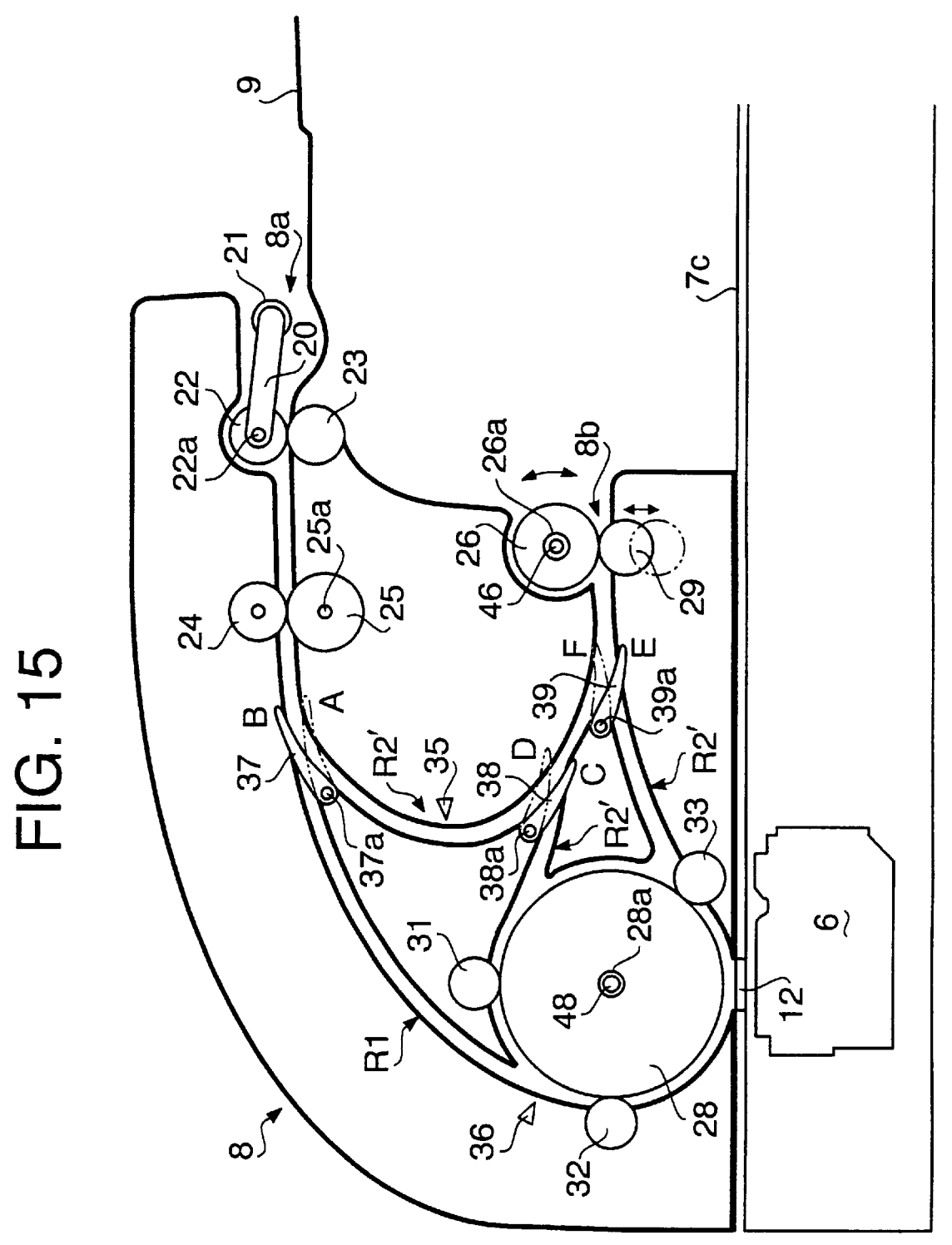

Referring to FIG. 15, first will be described the transportation of the sheets. ADF 8 has a first paper path R1 which extends from the paper inlet 8a to the paper outlet 8b and is generally shaped "C" as viewed laterally, and a second paper path R2' which is generally shaped "ε" between the paper inlet 8a and outlet 8b. The extra roller 26 is disposed near the paper exit 8b, and the press roller 29 is disposed below the extra roller 26. The nip between the separate roller 22 and retard roller 23 is situated near the paper inlet 8a. A pair of swingable arms 20 extend forwards (to the right in the drawing) from ends of the separate roller 22 such that they support a pick-up roller 21 at their free ends. A nip between the slave feed roller 24 and master feed roller 25, a nip between the extra roller 26 and press roller 29, a nip between the giant feed roller 28 and first slave roller 31, a nip between the giant feed roller 28 and second slave roller 32, a nip between the giant feed roller 28 and third slave roller 33, and a nip between the extra roller 26 and press roller 29 are arranged in turn along the second ε-shaped paper path R2' from the paper inlet 8a to the paper exit 8b.

The pick-up roller 21, separate roller 22, retard roller 23 and other elements function in combination to separate original sheets stacked on the paper feed tray 9 one sheet at a time and feed it to the paper path from the paper inlet 8a.

An upper half of the second paper path R2' is a means for turning the original sheet upside down prior to scanning. The extra roller 26 and press roller 29 is a means for reversing the transferring direction of the turned sheet to feed the sheet to the platen glass 12. The extra roller 26 also serves as a means for reversing the transferring direction of the sheet after scanning at the platen glass 12 such that the sheet proceeds to the platen glass 12 again. The giant feed roller 28 and slave rollers 31, 32 and 33 constitute in combination a means for guiding the original sheet to the platen glass 12.

Shafts 25a, 26a and 28a of the master feed roller 25, extra roller 26 and giant feed roller 28 are fixedly supported by the lateral plates of the ADF main housing at their ends respectively, and the rollers 22, 25, 26 and 28 are driven by the drive source and power transmission mechanism installed inside one or both of the lateral frames 7a and 7b. Thus, the rollers 22, 25, 26 and 28 are drive rollers, and the rollers 24, 29, 31, 32 and 33 are driven (or trailing) rollers that rotate with the drive rollers.

The first guide member 37 is disposed slightly downstream of the nip of the slave feed roller 24 and master feed roller 25. Specifically, the first guide member 37 is located at a first bifurcation of the first paper path R1 and second paper path R2'. The first guide member 37 can pivot up and down about the shaft 37a so that selection of the paper path can be made. Specifically, when a user operates the function keys 18 on the control panel 13 to decide which side of the sheet should be scanned, and selects the one-side scanning mode, the first guide member 37 pivots to a lower position A so that the sheet is transported into the first paper path R1. If the user selects the both-side scanning mode, the first guide member pivots to an upper position B so that the sheet proceeds to the second paper path R2'.

The second guide member 38 is located at a second branching point downstream of the first branching point in the second paper path R2'. The second guide member 38 pivots to a lower position C or an upper position D so as to regulate a moving direction of the sheet.

The third guide member 39 is located at a third branching point downstream of the second branching point (closer to the paper exit 8b) in the second paper path R2'. The third guide member 39 pivots to a lower position E or an upper position F so as to regulate a moving direction of the sheet.

The first position sensor 35 is provided at an appropriate position in the second paper path R2' between the nip of the slave feed roller 24 and master feed roller 25 and the nip of the extra roller 26 and press roller 29 to detect passage of the sheet. The second position sensor 36 is provided near the confluence of the first paper path R1 and second paper path R2' to detect passage of the sheet.

The shaft 26a of the extra roller 26 and shaft 28a of the giant feed roller 28 incorporate the first and second angular sensors 46 and 48 respectively to detect rotation angles of the rollers.

The controller 40 of this embodiment is similar to the controller 40 of the first embodiment. As illustrated in FIG. 7, the controller 40 of the second embodiment is also connected to various sensors, members and other elements.

The mechanism for turning the sheet upside down in this embodiment will be described in detail in reference to FIGS. 16 to 21.

Figure 17:
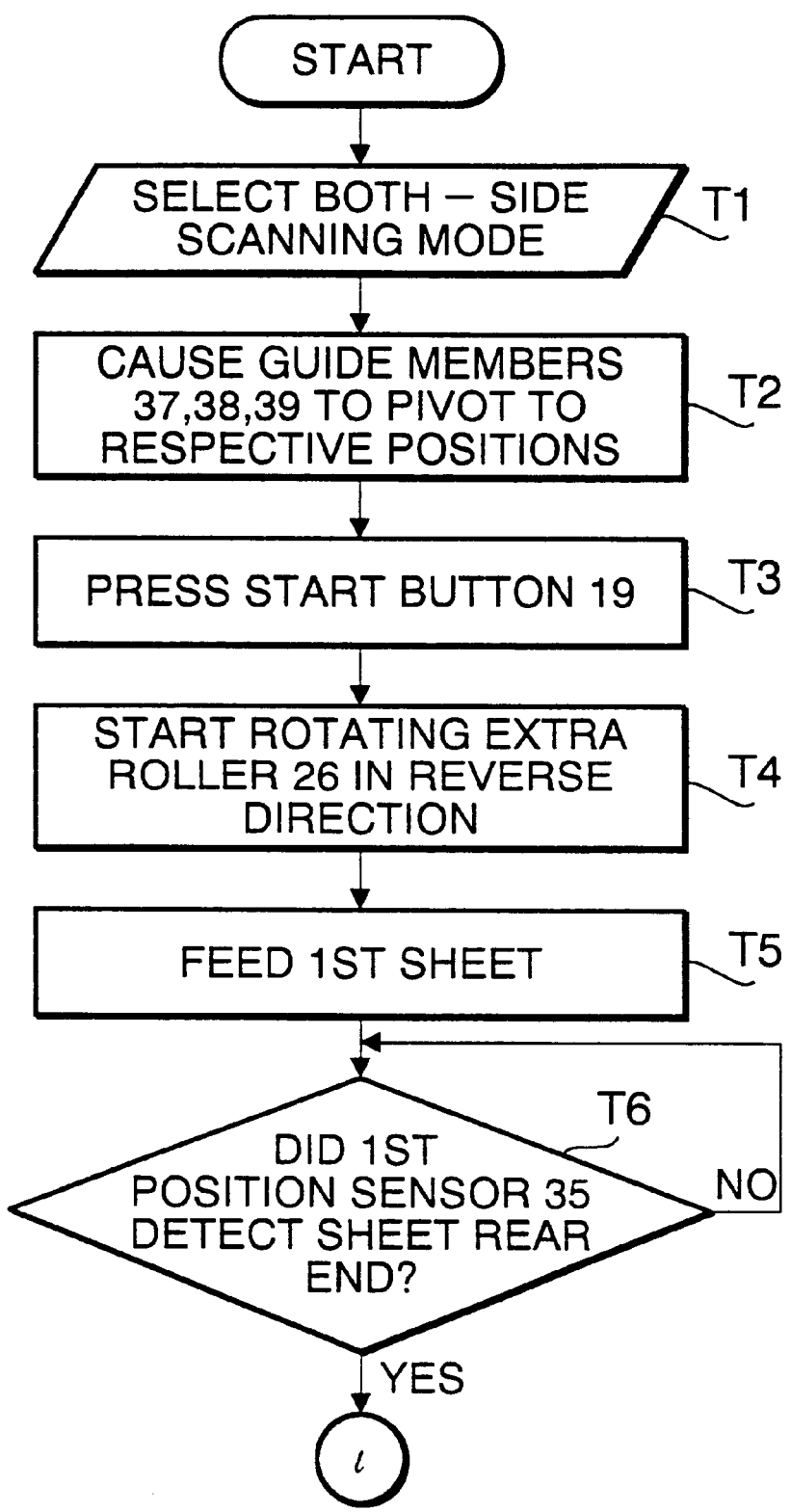
FIG. 17 is a flowchart illustrating a first stage of the operation.

Referring to FIG. 17, a user first loads an original sheet on the feed tray 9 with the front side of the sheet being up. Then, the user operates the function keys 18 on the operation panel 13 to select the both-side scanning mode (Step T1). The controller 40 issues control signals to the guide members 37, 38 and 39 to switch their positions such that the first guide member 37 is caused to pivot to the upper position B, the second guide member 38 to the lower position C and the third guide member 39 to the lower position E (Step T2).

As the user presses the start button 19 on the operation panel 13 (Step T3), the controller 40 issues control signals to the drive source 41 and power transmission mechanism 42 of the extra roller 30 and other rollers 22, 25, 26 and 28. As a result, the extra roller 26 rotates in the reverse direction (counterclockwise in FIG. 15) (Step T4), and the pick-up roller 21, separate roller 22 and retard roller 23 in combination pick up the uppermost one of the sheets (first original sheet) from the paper stack. The first original sheet is then transferred to the paper path from the paper inlet 8a, and further transported by the master feed roller 25 and slave feed roller 24 towards the second paper path R2' (Step T5).

The first original sheet is transferred to the space above the discharge tray 7c from the paper exit 8b by the extra roller 26 and press roller 29. When the first position sensor 35 detects passage of the rear end of the first original sheet (Step T6), a detection signal is issued to the controller 40. The controller 40 then issues instruction signals to the second guide member 38 and extra roller 26.

Figure 18:
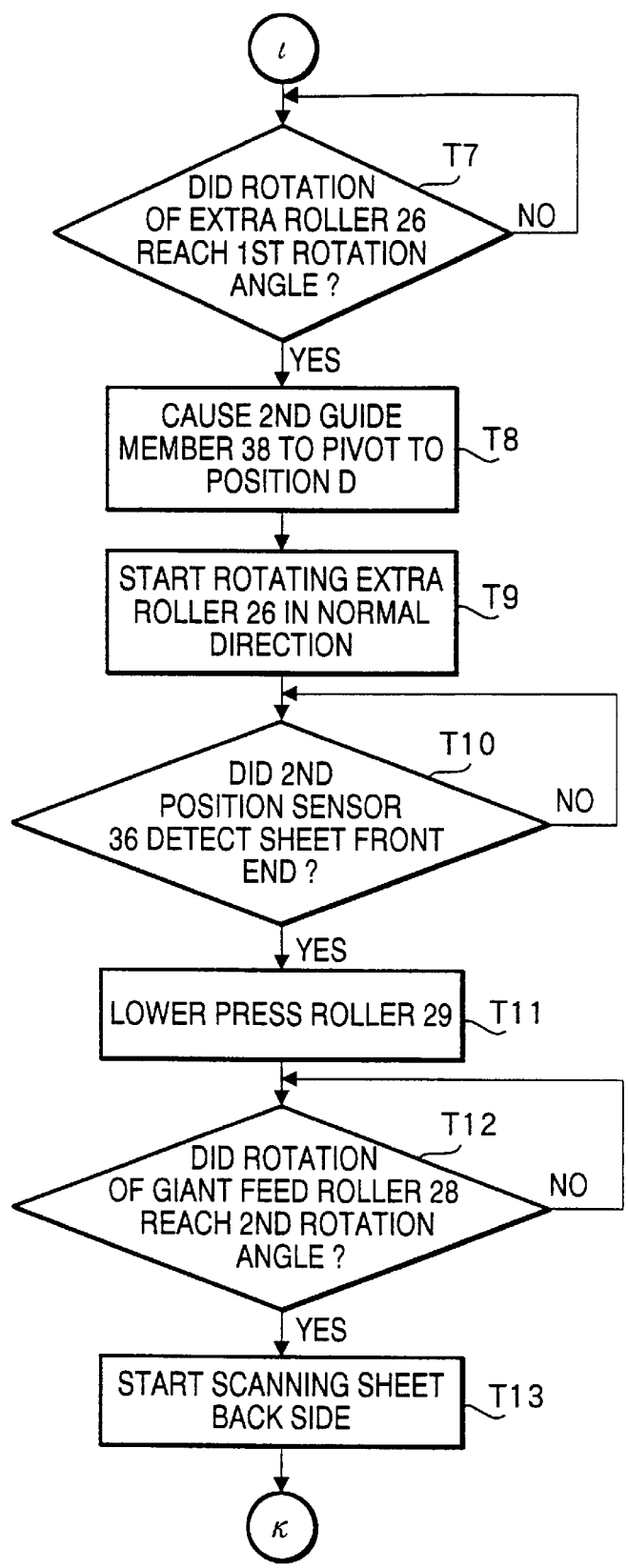
FIG. 18 illustrates a flowchart of a second stage of the operation.

When the first position sensor 35 detects passage of the rear end of the first original sheet, the controller 40 controls the rotation angle of the extra roller 26 (first rotation angle) such that the rear end of the sheet is further transported from the position of the first position sensor 35 to a mid point between the third guide member 39 and the nip of the extra roller 26 and press roller 29. Specifically, as illustrated in FIG. 18, when the first angular sensor 46 detects the first rotation angle (Step T7), most of the sheet is discharged from the paper exit 8b and the rear end of the sheet is only nipped between the extra roller 26 and press roller 29. At this point, the second guide member 38 is switched to the upper position D in order to prevent the sheet from moving backwards towards the paper inlet 8a (Step T8). Simultaneously, the extra roller 26 is caused to rotate in the normal direction (clockwise in FIG. 15) (Step T9), and the first original sheet is transferred in the opposite direction by the extra roller 26 and press roller 29.

The first original sheet moving backwards is caught by the giant feed roller 28 and first slave roller 31. When the front end of the first original sheet is detected by the second position sensor 36 (Step T10), a detection signal is sent to the controller 40. The controller 40 produces control signals to the lift mechanism 43 of the press roller 29 and the scanner 6.

The press roller 29 is lowered to be spaced from the extra roller 26 (Step T11). Therefore, the sheet front and rear ends can smoothly move in opposite directions in a gap between the rollers 26 and 29.

When the second position sensor 36 detects passage of the front end of the first original sheet, the controller 40 causes the second angle sensor 48 to measure the rotation angle of the giant feed roller 28 (second rotation angle), which corresponds to the moving distance of the sheet front end from the position of the second position sensor 36 to the rear end of the platen glass 12. When the second rotation angle is reached (Step T12), the scanning of the back side of the first original sheet is started (Step T13).

Figure 19:
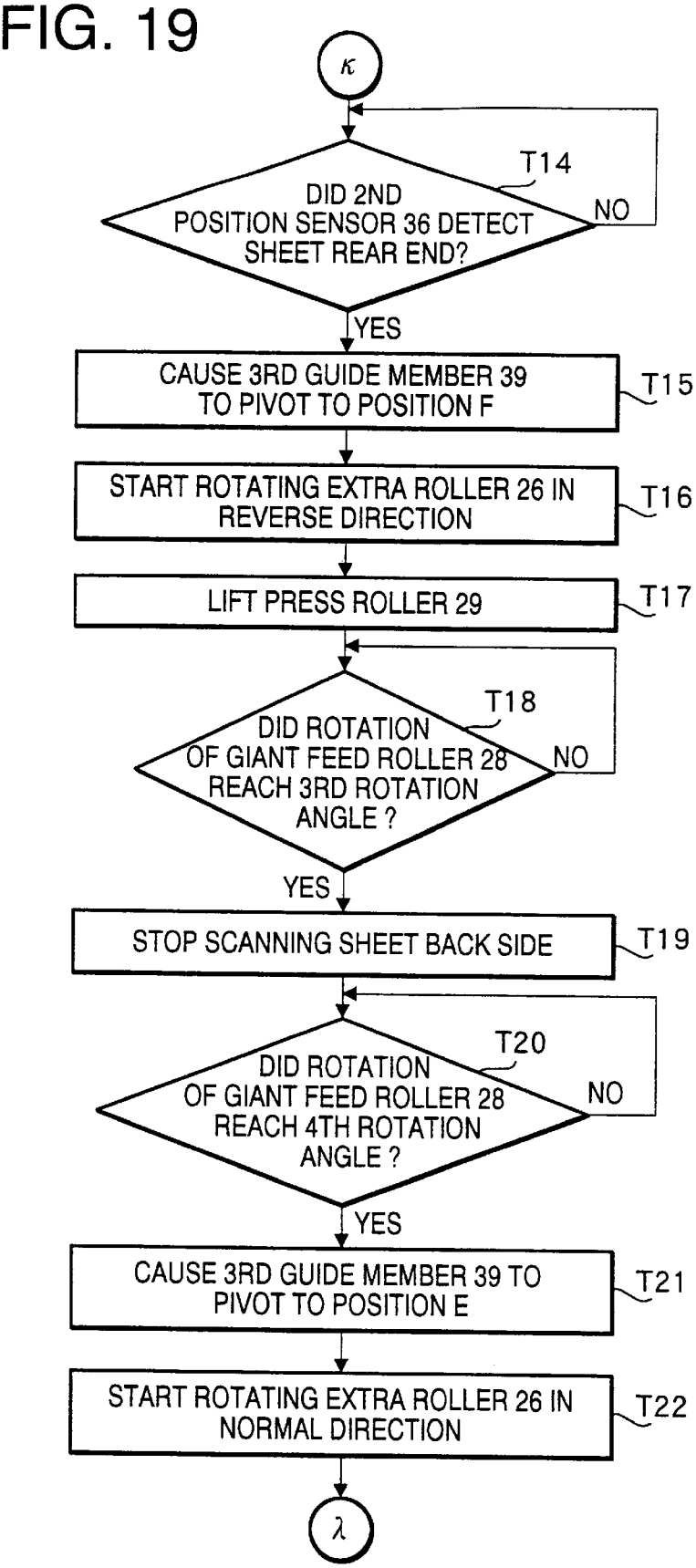
FIG. 19 illustrates a flowchart of a third stage of the operation.

Referring to FIG. 19, the first original sheet is transported by the giant feed roller 28 and second slave roller 32 or third slave roller 33. When passage of the rear end of the first original sheet is detected by the sensor position sensor 36 (Step T14), a detection signal is output to the controller 40. The controller 40 sends instruction signals to the lift mechanism 43 of the press roller 29, third guide roller 39, extra roller 26 and scanner 6 respectively.

When the second position sensor 36 detects passage of the rear end of the first original sheet, the controller 40 causes the third guide member 39 to pivot to the upper position F (Step T15) and the extra roller 26 to rotate in the reverse direction (counterclockwise in FIG. 15) (Step T16). The controller 40 then lifts the press roller 29 so that the extra roller 26 contacts the press roller 29 again (Step T17). From this point of time, the angle sensor 48 measures the rotation angle of the giant feed roller 28 (third rotation angle, greater than the second rotation angle) which corresponds to the transportation distance of the sheet rear end from the position of the second position sensor 36 to the front end of the platen glass 12, and the rotation angle of the giant feed roller 28 (fourth rotation angle) which corresponds to the transportation distance of the sheet rear end from the position of the second position sensor 36 to a mid position between the third guide member 39 and the nip of the extra roller 26 and press roller 29. When the third rotation angle is arrived at (Step T18), the scanning of the back side of the first original sheet is completed (Step T19).

Further, when the fourth rotation angle is detected by the angle sensor 48 (Step T20) and most of the first original sheet is discharged from the paper exit 8b such that the rear end of the sheet is only nipped between the extra roller 26 and press roller 29, then the third guide member 39 is caused to pivot to the lower position E (Step T21), and the rotating direction of the extra roller 26 is switched to the normal direction (clockwise in FIG. 15) (Step T22).

Figure 20:
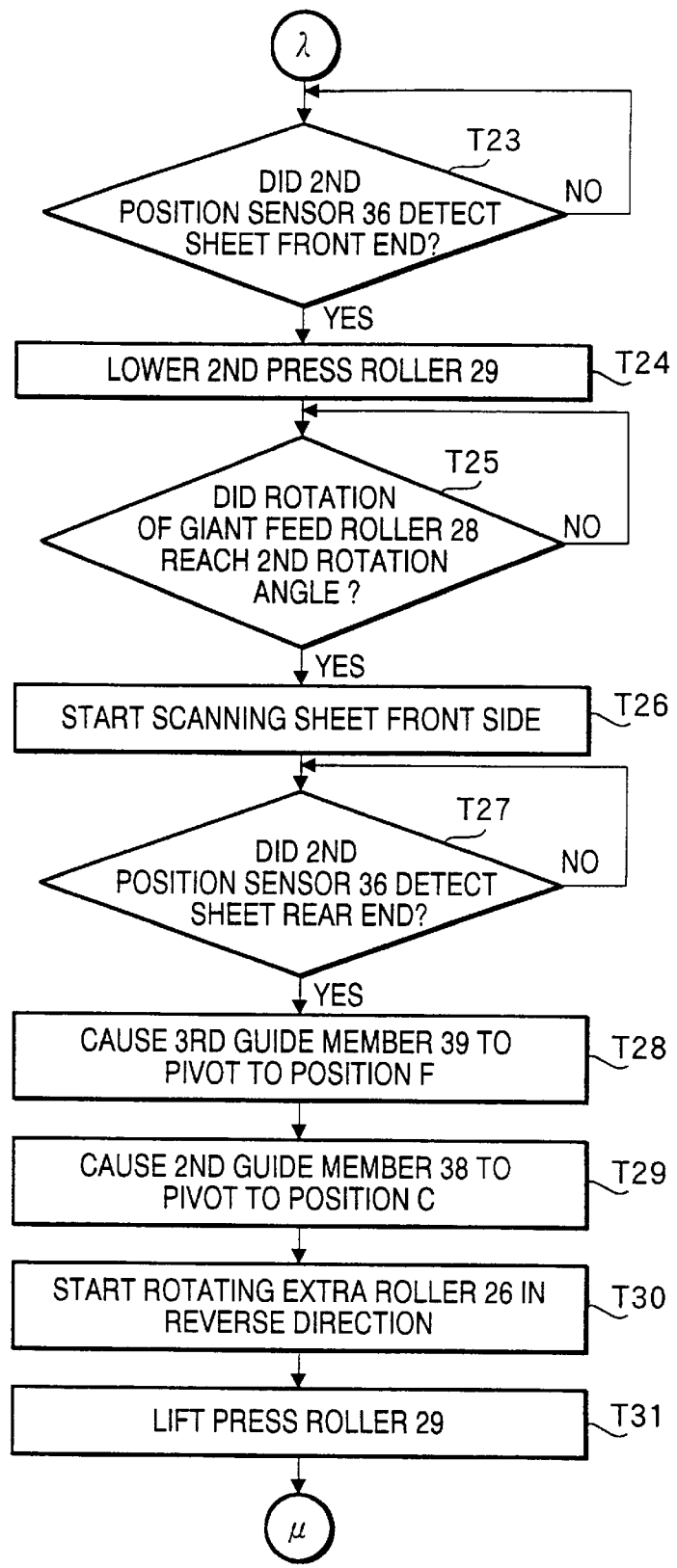
FIG. 20 illustrates a flowchart of a fourth stage of the operation.

In this manner, the first original sheet is transferred and caught by the giant feed roller 28 and first slave roller 31. As shown in FIG. 20, the front end of the first original sheet (this "front end" is the front end of the sheet when loaded at the paper inlet 8a) is eventually detected by the second position sensor 36 (Step T23). A detection signal is issued to the controller 40. The controller 40 issues command signals to the lift mechanism 43 of the press roller 29 and the scanner 6.

As a result, the press roller 29 descends so that it is separated from the press roller 29 (Step T24).

When the second position sensor 36 detects the front end of the first original sheet, the controller 40 causes the angle sensor 48 to measure the rotation angle of the giant feed roller 28. When the second rotation angle is arrived at (Step T25), the scanning of the front side of the first original sheet is initiated (Step T26).

Subsequently, the first original sheet is transported by the giant feed roller 28 and second slave roller 32 or third slave roller 33. When the second position sensor 36 detects passage of the rear end of the first original sheet (Step T27), such a fact is informed to the controller 40. The controller 40 issues command signals to the second guide member 38, third guide member 39, extra roller 26 and lift mechanism 43 of the press roller 29 respectively. After that, the controller 40 also issues command signals to the scanner 6 and the power transmission mechanism 42 of the drive unit 41.

Figure 12:
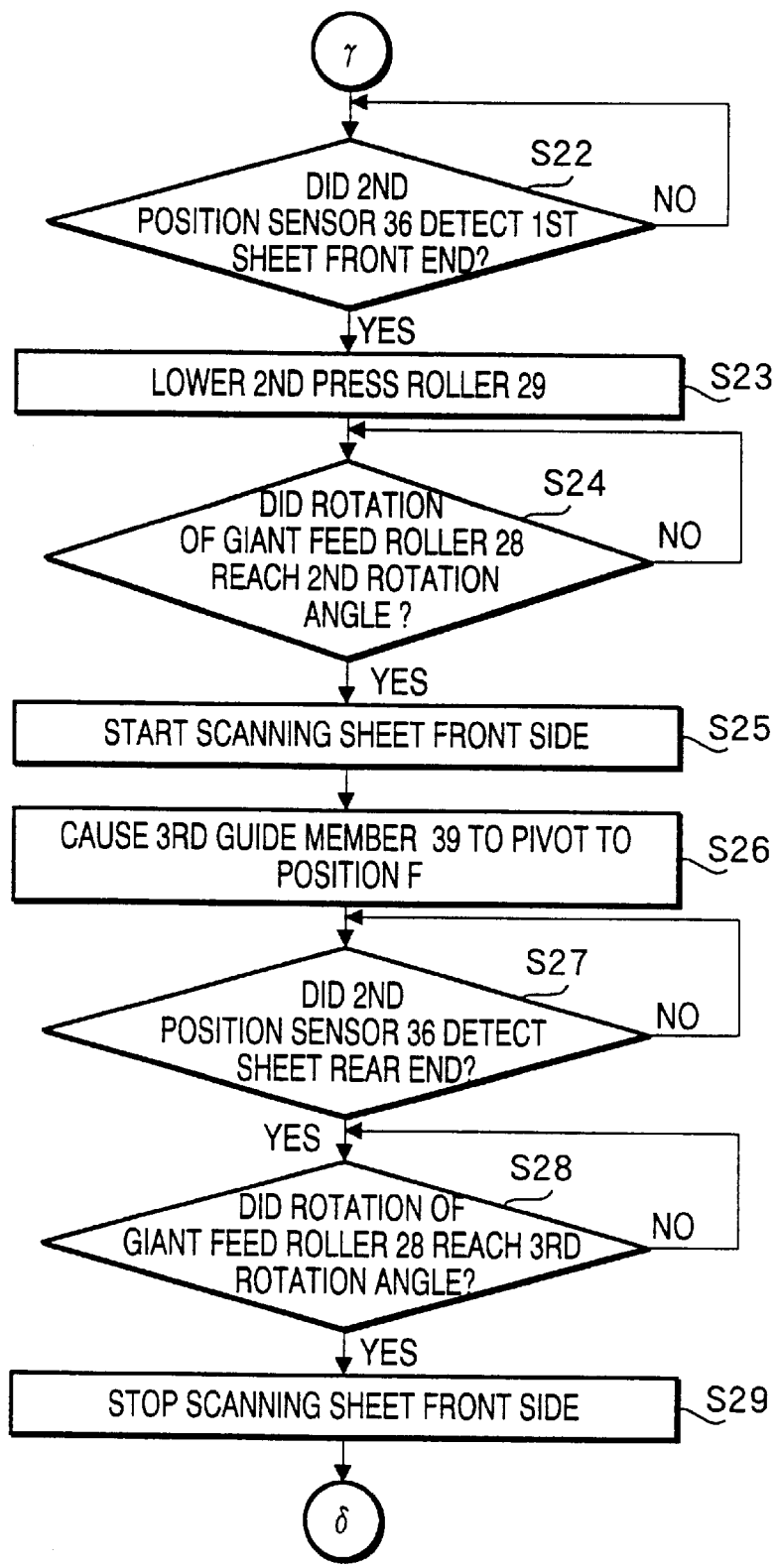
FIG. 12 illustrates a front half of a control loop according to the first embodiment.

The third guide member 39 pivots to the upper position F (Step T28) and the second guide member 38 pivots to the lower position C (Step T29). The extra roller 26 rotates in the reverse direction (counterclockwise in FIG. 12) (Step T30) and the press roller 29 ascends so that it contacts the extra roller 26 again (Step T31).

Figure 21:
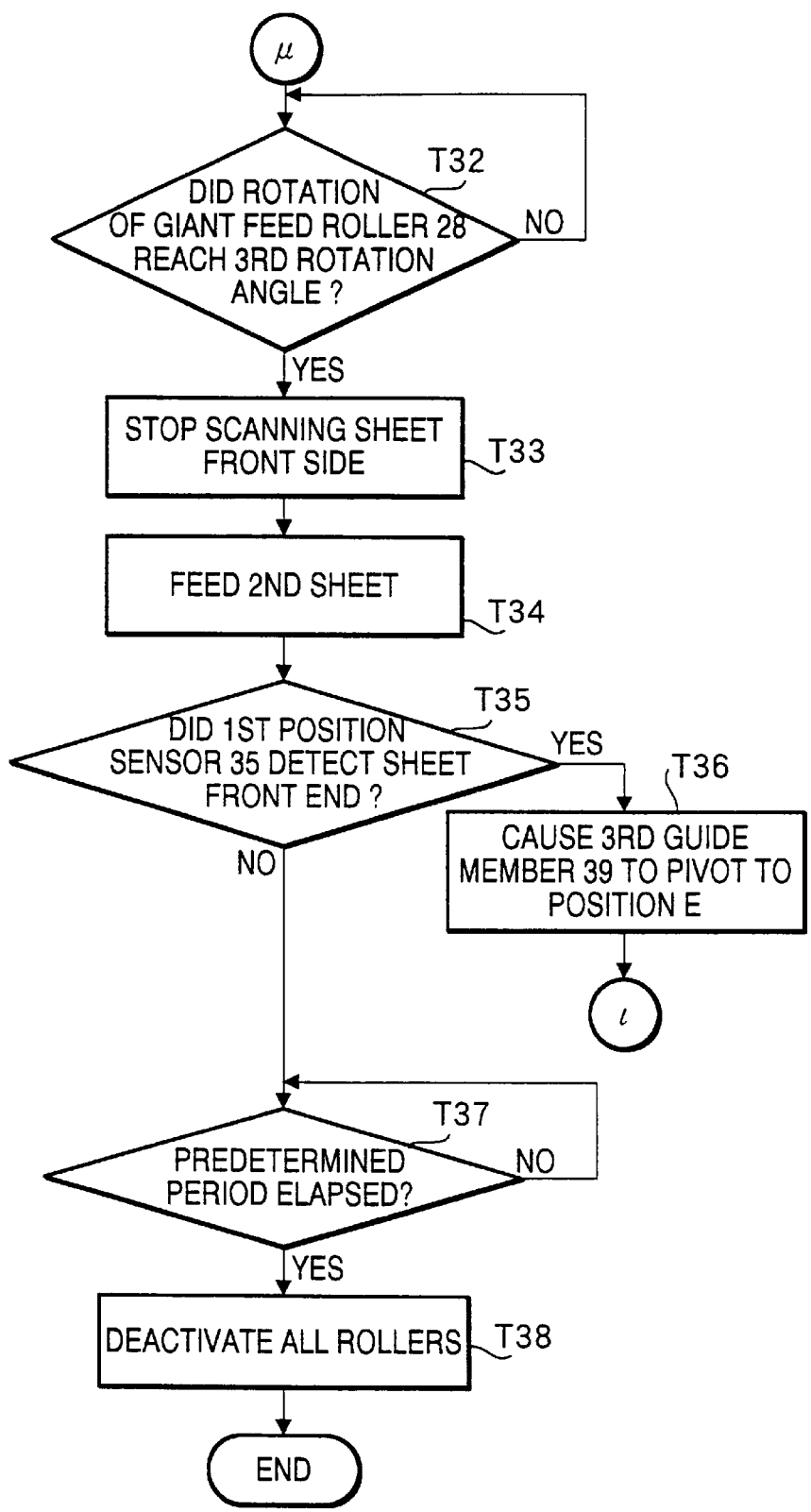
FIG. 21 illustrates a flowchart of a final stage of the operation.

As illustrated in FIG. 21, when the second position sensor 36 detects passage of the rear end of the first original sheet, the controller 40 causes the angle sensor 48 to count the rotation angle of the giant feed roller 28. When the third rotation angle is reached (Step T32), the scanning operation applied to the front side of the first original sheet is finished (Step T33).

The pick-up roller 21, separate roller 22, retard roller 23 and other rollers cooperate to separate the next uppermost sheet (second original sheet) from the paper stack and feed it into the paper path from the paper inlet 8a. The second original sheet is fed into the second paper path R2' by the master feed roller 25 and slave feed roller 24 (Step T34).

After the scanning of the front and back sides of the first original sheet, the second original sheet is transported to the paper exit 8b. When the first position sensor 35 detects passage of the front end of the second original sheet (Step T35), a detection signal is issued to the controller 40. The controller 40 then issues a switching signal to the third guide member 39 such that the third guide member 39 pivots to the lower position E (Step T36). Of course, the first original sheet is already discharged from the paper exit 8b by the extra roller 26 and press roller 29.

Regarding the subsequent treatment made to the second original sheet, the program returns to Step T6 in FIG. 17, and proceeds until Step T33 to transport and scan the original sheet. Similar procedure will be taken for a next original sheet.

When the last original sheet is processed, there is no next sheet so that the first position sensor 35 does not operate after Step T33 in FIG. 21. After a predetermined period, the program is terminated.

If the first position sensor 35 does not detect passage of a sheet within a predetermined period, during which the angle sensor 48 counts the third rotation angle of the giant feed roller 28 at Step T32 in FIG. 21 and a further angle larger than the fourth rotation angle (Step T37), all the rollers are deactivated (Step T38).

At this point of time, the last sheet is of course already discharged from the paper exit 8b by the extra roller 26 and press roller 29.

In this manner, the scanning to the first to last sheets is complete.

If ADF 8 is sufficiently elongated in the forward and backward directions (or the paper path is sufficiently elongated) such that a front end of a larger sheet such as A3 size sheet does not overlap a rear end of another larger sheet at the nip between the rollers 26 and 29 when the sheet transportation direction is reversed, then the lift mechanism 43 is not needed to the press roller 29. Thus, the number of parts can be reduced and a manufacturing cost is reduced. This can be said to both of the embodiments described above.

In this configuration, Steps S23 and S36 are dispensed with in the first embodiment, and Steps T11, T17, T24 and T31 are dispensed with in the second embodiment.

Although the transportation distance of the sheet is measured by the angle sensors 46 and 48 in the foregoing embodiments, it may be measured by a stepper motor, which will be installed in the drive power source 41. If a series of pulses are applied to multiple phase windings of a fixed stator of the stepper motor, a rotator rotates a predetermined angle upon each of the pulses; the stepper motor rotates stepwise upon pulses. The controller 40 counts the stepwise rotations of the stepper motor and determines the moving distance of the sheet.

In the above described embodiments, the sheet is turned upside down at the initial stage of the transportation process prior to scanning, and transferred to the scanner 6. Accordingly, the sheet passes over the platen glass 12 only twice. This reduces the total time needed to scan both sides of the sheet. In addition, the sheet placed at the feed tray 9 with its front side up is scanned from its back side first. Then, the sheet is turned upside down so that its front side is scanned. The sheet is then discharged onto the discharge tray with its front side down. The next sheet is discharged on the preceding sheet in the same manner. Thus, page 1 (first sheet front side) is directed down, page 2 (first sheet back side) is directed up, page 3 (second sheet front side) is directed down and contacts page 2, and page 4 (second sheet back side) is directed up. Since the sheet fed from the feed tray 9 is turned upside down while it is moving in the second paper path R2', transported backwards by the extra roller 26 and press roller 29, and guided by the giant feed roller 28 and slave rollers 31, 32 and 33 to the platen glass 12 (or the scanner 6), it does not approach the platen glass 12 from the upper diagonal direction. This prevents slant movement of the sheet so that the scanning degradation and jamming are avoided.

What is claimed is:

1. An image scanning apparatus comprising:
a scanner;
a document feeder for receiving sheets in a stack and feeding one sheet at a time, each sheet having two sides;
an inverting path for turning a sheet, which is fed from the document feeder, upside down before scanning while transferring the sheet from an upper position to a lower position a downstream end of which is located below the document feeder;
a transportation means located at a downstream end of the inverting path for reversing a transportation direction of the sheet and feeding the sheet to the scanner so as to scan one side of the sheet, wherein the transportation means includes:
a return path,
a guide member that bifurcates the return path and the inverting path, and
a reversing means for reversing the transportation direction of the sheet after the scanner scans the one side of the sheet, and feeding the sheet to the scanner again to scan the other side of the sheet.

2. The image scanning apparatus according to claim 1, wherein the transportation means includes at least one roller, and the reversing means includes at least one roller.

3. The image scanning apparatus according to claim 1, wherein three rollers are arranged to form two pairs of rollers, and one of the two pairs of rollers constitute the transportation means whereas the other pair of rollers constitute the reversing means.

4. The image scanning apparatus according to claim 3 further including discharging means for discharging the sheet from the image scanning apparatus after the two sides of the sheet are scanned, wherein the other pair of rollers also constitute the discharging means.

5. The image scanning apparatus according to claims 4, wherein two rollers are arranged to constitute all of the transportation means, reversing means and discharging means.

6. An apparatus for scanning front and back sides of a sheet comprising:
scanning means;
document feeding means for feeding sheets sheet by sheet, each sheet having front and back sides;
an inverting path that turns a sheet, which is fed from the document feeding means, upside down before scanning while transferring the sheet from an upper position to a lower position a downstream end of which is located below the document feeder;
means for reversing a transportation direction of the sheet and feeding the sheet to the scanning means so as to scan a back side of the sheet, wherein the means for reversing includes:
return path,
a guide member that bifurcates the return path and the inverting path, and
means for reversing the transportation direction of the sheet after the scanning means scans the back side of the sheet;
means for feeding the sheet to the scanning means again to scan the back side of the sheet; and
means for discharging the sheet from the apparatus.

7. A method of scanning front and back sides of a sheet comprising the steps of:
A) feeding a sheet into a scanning machine;
B) turning the sheet upside down before scanning via an inverting path while transferring the sheet from an upper position to a lower position a downstream end of which is located below the document feeder;
C) reversing a transportation direction of the sheet and feeding the sheet to a scanner so as to scant a back side of the sheet;

D) reversing, via a return path, the transportation direction of the sheet after the scanner scans the back side of the sheet, wherein a guide member bifurcates the return path and the inverting path;

E) feeding the sheet to the scanner again to scan the back side of the sheet; and F) discharging the sheet from the scanning machine.

8. An image scanning apparatus comprising:

a scanner;

a document feeder adapted to receive sheets, each sheet having two sides;

an inverting path adapted to turn a sheet while transferring the sheet from an upper position to a lower position a downstream end of which is located below the document feeder; and a transportation means located at a downstream end of the inverting path, wherein the transportation means includes a return path, and a guide member that bifurcates the return path and the inverting path to open one of the return and inverting paths and close the other of the return and inverting paths, whereby it is possible to introduce the sheet into the return path after the sheet is fed towards the scanner from the downstream end of the inverting path.

9. The image scanning apparatus according to claim 8, further comprising:

a reversing means adapted to reverse the transportation direction of the sheet after the scanner scans the one side of the sheet, and feed the sheet to the scanner again to scan the other side of the sheet.

10. The image scanning apparatus according to claim 8, wherein the document feeder receives sheets in a stack and feeds one sheet at a time.

11. The image scanning apparatus according to claim 8, wherein the inverting path adapted to turn a sheet, comprises:

an inverting -path adapted to turn a sheet, which is fed from the document feeder, upside down before scanning.

12. The image scanning apparatus according to claim 8, wherein the transportation means located at a downstream end of the inverting path is adapted to reverse a transportation direction of the sheet and feed the sheet to the scanner so as to scan one side of the sheet.

13. The image scanning apparatus according to claim 8, wherein the return path is adapted to guide the sheet from the downstream end of the inverting path to the scanner.

14. The image scanning apparatus according to claim 8, wherein the transportation means includes at least one roller, and the reversing means includes at least one roller.

15. The image scanning apparatus according to claim 8, wherein three rollers are arranged to form two pairs of rollers, and one of the two pairs of rollers constitute the transportation means whereas the other pair of rollers constitute the reversing means.

16. The image scanning apparatus according to claim 1, further comprising:

control means for controlling such that after scanning one side of the sheet by the scanner, the sheet nipped at the rear end thereof by the reversing means is transferred to the scanner, at the same time the sheet stacked on the sheet feeding tray is inverted upside down through the inverting path and is transferred to the transportation means located at the downstream end of the inverting path.

17. An image scanning apparatus comprising:

a scanner;

a document feeder for receiving sheets in a stack and feeding one sheet at a time;

a one-side document transferring path for transferring a one-side sheet to the scanner, the one-side sheet being fed from the document feeder;

an inverting path for turning a two-side sheet, which is fed from the document feeder, upside down before scanning;

bifurcating means for bifurcating the one-side document transferring path and the inverting path at more downstream position than a pair of handling rollers;

a pair of reversing rollers for reversing a transportation direction of the sheet which is positioned at the end of the inverting path, thereafter transferring the sheet to a pair of transferring rollers which transfer the sheet to the scanner, reversing the transportation direction of the sheet after one side of the sheet is scanned by the scanner, transferring the sheet to the scanner again, and discharging the sheet to a discharging portion after another side of the sheet is scanned by the scanner;

control means for controlling the pair of reversing rollers to be moved apart from each other just before the front end and the rear end of the sheet pass each other, if the length of a path which starts from the pair of reversing rollers and reverses again to the pair of reversing rollers via the scanner is shorter than the length of the sheet.

* * * * *